US009582506B2

(12) United States Patent
Datha et al.

(10) Patent No.: US 9,582,506 B2
(45) Date of Patent: Feb. 28, 2017

(54) CONVERSION OF DECLARATIVE STATEMENTS INTO A RICH INTERACTIVE NARRATIVE

(75) Inventors: Narendranath Datha, Karnataka (IN); Joseph Joy, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 13/327,802

(22) Filed: Dec. 16, 2011

(65) Prior Publication Data

US 2012/0089904 A1 Apr. 12, 2012

Related U.S. Application Data

(63) Continuation-in-part of application No. 13/008,324, filed on Jan. 18, 2011, which is a continuation-in-part of application No. 12/347,868, filed on Dec. 31, 2008, now Pat. No. 8,046,691.

(51) Int. Cl.
*G06F 17/21* (2006.01)
*G06F 17/30* (2006.01)
*G06F 17/22* (2006.01)

(52) U.S. Cl.
CPC .............................. *G06F 17/30056* (2013.01)

(58) Field of Classification Search
CPC .................................................. G06F 17/3089
USPC ........................................................ 715/235
See application file for complete search history.

(56) References Cited

U.S. PATENT DOCUMENTS

| 7,376,932 | B2 * | 5/2008 | Chen et al. .................... 717/106 |
| 2003/0164847 | A1 * | 9/2003 | Zaima et al. .................. 345/723 |
| 2004/0091848 | A1 * | 5/2004 | Nemitz .................... A63F 13/10 434/365 |
| 2006/0064733 | A1 * | 3/2006 | Norton ................. G11B 19/025 725/135 |
| 2007/0006078 | A1 * | 1/2007 | Jewsbury et al. ............. 715/716 |
| 2007/0038931 | A1 * | 2/2007 | Allaire et al. ................ 715/526 |
| 2007/0169165 | A1 * | 7/2007 | Crull et al. .................... 725/135 |
| 2007/0214408 | A1 * | 9/2007 | Straub et al. ................. 715/513 |
| 2008/0256005 | A1 * | 10/2008 | Van Doorn ........... G06F 3/0481 706/11 |

(Continued)

OTHER PUBLICATIONS

Li et al., "Characteristics of Streaming Media Stored on the Web", ACM, 2005, pp. 601-626.*

(Continued)

*Primary Examiner* — James J Debrow
(74) *Attorney, Agent, or Firm* — Aaron Chatterjee; Dan Choi; Micky Minhas

(57) ABSTRACT

Technologies pertaining to conversion of declarative statements written in a domain-specific language to data that is playable by a rich interactive narrative (RIN) player are described herein. A web browser can be configured to support a RIN player. Source code of a web page includes an indication that the RIN player is to be invoked, declarative statements written in the domain-specific language, and data that identifies a network-accessible location of a converter. The converter is configured to convert declarative statements in the domain-specific language to RIN data that is playable by the RIN player. Thus, a developer of a web page can utilize declarative statements in the domain-specific language to cause a RIN to be included in a web page.

20 Claims, 19 Drawing Sheets

(56) References Cited

U.S. PATENT DOCUMENTS

| | | | |
|---|---|---|---|
| 2009/0094522 A1* | 4/2009 | Tu ........................ | G06Q 30/02 |
| | | | 715/738 |
| 2009/0100452 A1* | 4/2009 | Hudgeons et al. ............. | 725/9 |
| 2009/0187481 A1 | 7/2009 | Bonzi et al. | |
| 2009/0187837 A1* | 7/2009 | Fusaro .................. | G06F 9/4443 |
| | | | 715/762 |
| 2009/0217242 A1* | 8/2009 | Banks ......................... | 717/115 |
| 2009/0228572 A1* | 9/2009 | Wall et al. ................... | 709/218 |
| 2010/0050082 A1* | 2/2010 | Katz et al. ................... | 715/719 |
| 2011/0113334 A1 | 5/2011 | Joy et al. | |
| 2011/0119587 A1 | 5/2011 | Joy et al. | |

OTHER PUBLICATIONS

Meier, et al., "Microsoft Pattern and Practices", Retrieved at <<http://apparchguide.codeplex.com/wikipage?title=Chapter %2014%20-%20Application%20Archetypes>>, Retrieved Date: Oct. 19, 2011, pp. 1-7.

"Qumu Create", Retrieved at <<http://www.digitalvideo.de/Software/PDFpages/Qumu.pdf>>, Retrieved Date: Oct. 19, 2011, pp. 1-5.

Cheong, et al., "PRISM: A Framework for Authoring Interactive Narratives", Retrieved at <<http://www.itu.dk/people/yugc/pdffile/ICIDS08PRISM.pdf>>, Proceedings of the 1st Joint International Conference on Interactive Digital Storytelling: Interactive Storytelling (ICIDA), 2008, LNCS 5334, pp. 297-308.

"digitalnarratives", Retrieved at <<http://www.digitalnarratives.net/About.aspx>>, Retrieved Date: Oct. 19, 2011, p. 1.

* cited by examiner

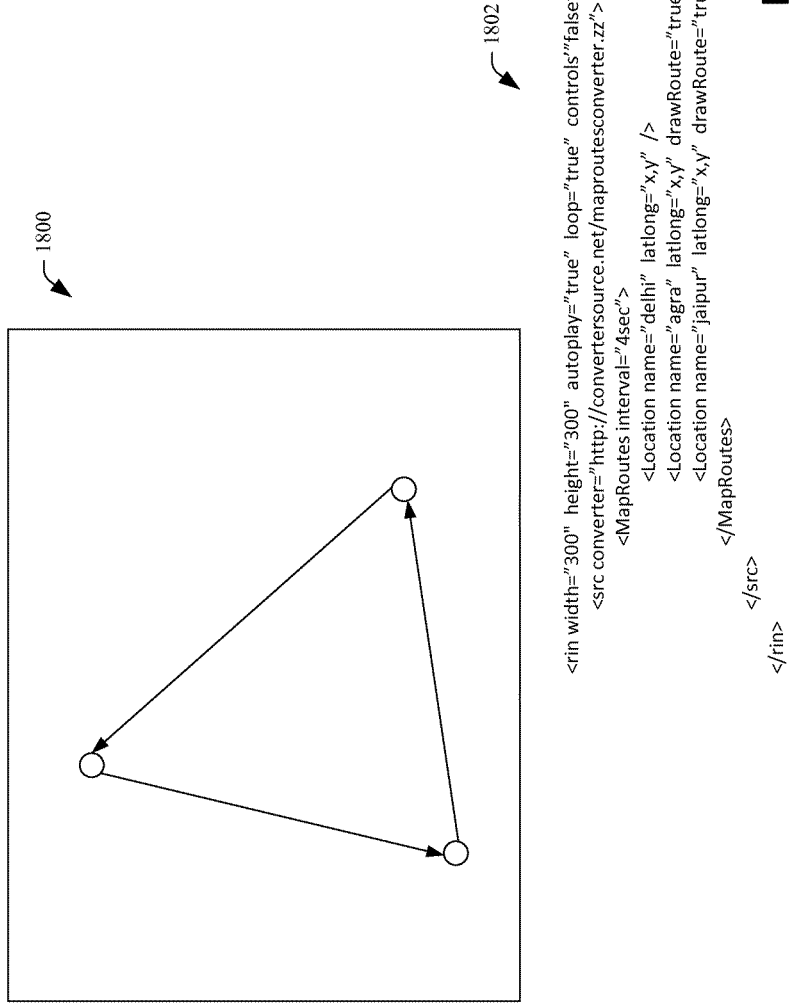

FIG. 18

```
<rin width="300" height="300" autoplay="true" loop="true" controls="false"
    <src converter="http://convertersource.net/maproutesconverter.zz">
        <MapRoutes interval="4sec">
            <Location name="delhi" latlong="x,y" />
            <Location name="agra" latlong="x,y" drawRoute="true" />
            <Location name="jaipur" latlong="x,y" drawRoute="true" />
        </MapRoutes>
    </src>
</rin>
```

CONVERSION OF DECLARATIVE STATEMENTS INTO A RICH INTERACTIVE NARRATIVE

RELATED CASES

This application is a continuation-in-part of U.S. patent application Ser. No. 13/008,324, filed on Jan. 18, 2011, and entitled "DATA MODEL AND PLAYER PLATFORM FOR RICH INTERACTIVE NARRATIVES", which is a continuation-in-pall of U.S. patent application Ser. No. 12/347,868, filed on Dec. 31, 2008, and entitled "GENERALIZED INTERACTIVE NARRATIVES". The entireties of these applications are incorporated herein by reference.

BACKGROUND

The linear, narrative method of conveying information has a long history that continues to this day. This method generally entails presenting information in a sequential manner. Verbal storytelling, classroom lectures, novels, text books, magazines, journals, slide presentations, movies, documentaries, how-to videos, online articles, and blogs, are but a few examples of linear narratives. However, narratives are not the only way information is currently conveyed. There is also interactive exploration.

Interactive exploration is often used for visualization of complex data. This method generally entails presenting information in an organized, often hierarchical manner, which allows a user to intelligently search through the data. Browsable maps in 2D and 3D are an example where interactive mapping software enables users to explore a vast space with customizable data layers and views. Another example is a photosynth which enables exploration of collections of images embedded in a re-created 3D space. Yet another example is the so-called pivot control that enables a visually rich, interactive exploration of large collections of items by "pivoting" on selected dimensions or facets. These examples represent just a small number of the many interactive exploration schemes that exist today—and it is anticipated there will be many more developed in the future.

Conventionally, however, media rich interactive experiences on a webpage are implemented as one-off websites that utilize customized and complex code. This is because popular presentation layers are quite low level, including but not limited to HTML and other multimedia platforms that are employed to add information, video, and interactivity to webpages. Accordingly, to present a media rich experience on a web page to an end user, a designer of such web page must use non-trivial client and server-side code, or utilize relatively simple embeddings (such as embedding a video player in a web page). This issue can be mitigated by having a common server-side infrastructure, as well ask client-side libraries, such that rich content can be populated from data-driven sources (such as advertisement data). This, however, requires specialized coding on the server, which is generally not problematic for high profile sites that have a significant amount of financial resources, but is not feasible for web pages that are not generated by developers with significant resources. Further, even when customized server-side code is employed, the scope (type) of automatically generated rich media that can be displayed is relatively limited to slideshows or simple media lists, which reflects the complexity of generating rich media experiences.

SUMMARY

The following is a brief summary of subject matter that is described in greater detail herein. This summary is not intended to be limiting as to the scope of the claims.

Various technologies pertaining to a data model and player platform for rich interactive narratives (RINs) are described herein, which generally combine the narrative and interactive exploration schemes for conveying data. For example, such a combination is found in one embodiment of a system for processing RIN data to provide a narrated traversal of arbitrary media types and user-explorable content of the media. In this exemplary RIN system, the RIN data is stored on a computer-readable storage medium, which is accessible during play-time by a RIN player running on a user's computing device. The computing device includes, among other things, audio playback equipment, a display device, and a user interface input device. The RIN data is input to the user's computing device and stored on the computer-readable storage medium.

In one implementation, the RIN data includes a narrative having a prescribed sequence of scenes, where each scene is made up of one or more RIN segments. Each of the RIN segments includes one or more experience streams (or references thereto) and at least one screenplay. Each experience stream includes data that enables traversing a particular interactive environment representing one of the aforementioned arbitrary media types whenever the RIN segment is played. In addition, each screenplay includes data to orchestrate when each experience stream starts and stops during the playing of the RIN data and to specify how experience streams share display screen space or audio playback configuration.

In an exemplary embodiment, declarative statements written in domain specific languages can be converted into the format corresponding to the data model for the RIN player (RIN data). For example, such declarative statements can define what multimedia content is to be presented on certain portions of a display screen, a sequence of presentation of the multimedia content, and an amount of time that the multimedia content is to be presented before other multimedia content is presented. As will be understood by one skilled in the art, a domain specific language is a programming language or specification language that is dedicated to a particular problem domain, a particular problem representation technique, and/or a particular solution technique. An exemplary domain specific programming language is HTML. Certain problem domains that can be addressed using the domain specific programming language include the presentation of slideshows in a web browser, wherein the slideshows have images that are to be displayed in a particular sequence (and can be interacted with by the end user). In another exemplary domain, web tutorials can be presented to a viewer of a webpage, wherein the web tutorials comprise a sequence of images (e.g., which depict desired positions of a cursor over time) and/or audio that illustrates to the user how to interact with the web page, and where the interactive sequence is at least partially defined in a domain specific language.

In an exemplary embodiment, a RIN player can be implemented as a plug-in to a web browser. A developer of a web page can include declarative statements in a domain specific language in the web page, and can also identify a location of a converter that is configured to convert the declarative statements in the domain specific language to RIN data (data that can be interpreted by the RIN player to present an interactive narrative on the web page). The web browser can read the underlying code of the web page, can identify the location of the converter, retrieve such converter, which can be employed to convert the declarative statements in the domain specific language to RIN data. The RIN player may then cause a rich interactive narrative to be presented on the web page. The converter may be developed by any suitable party, including a developer of the RIN player, an enthusiast in a particular domain, etc.

As mentioned above, such approach can allow for a web page developer with relatively limited resources and/or time to cause rich interactive narratives to be presented on a webpage without requiring use of complex server-side code. Instead, the web page developer can define a rich interactive narrative through utilization of declarative statements (e.g., written in XML), and can access an existing converter to convert such declarative statements to RIN data. A web browser with the RIN player installed thereon can identify that the RIN player is desirably invoked, can identity the converter that is desirably employed, and can identify the declarative statements in the domain specific language that are desirably utilized to define the sequence of the rich interactive narrative. The browser can then retrieve the specified converter and can access retrieve multimedia content specified in the web page that is to be displayed on the resulting web page, and can convert the declarative statements into the RIN data, resulting in the presentation of a rich interactive narrative to the end user without use of complex server-side code.

Other aspects will be appreciated upon reading and understanding the attached figures and description.

BRIEF DESCRIPTION OF THE DRAWINGS

FIGS. 17-19 illustrate exemplary code that can be interpreted by a web browser in connection with displaying a rich interactive narrative on a webpage.

DETAILED DESCRIPTION

Figure 1:
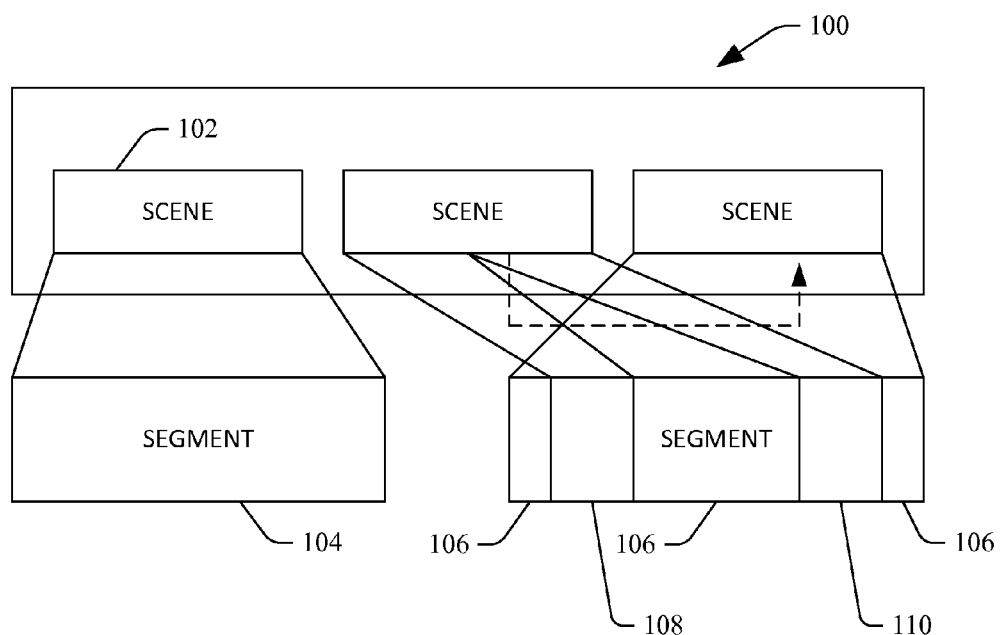
FIG. 1 is a simplified diagram of a Rich Interactive Narrative (RIN), including a narrative, scenes and segments.

Various technologies pertaining to conversion of declarative statements written in a domain specific language (DSL) to rich interactive narrative (RIN) data will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

In the following description of RIN data model and player platform embodiments, reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Rich Interactive Narrative Data Model

In general, embodiments of the rich interactive narrative (RIN) data model described herein are made up of abstract objects that can include, but are not limited to, narratives, segments, screenplays, resource tables, experience streams, sequence markers, highlighted regions, artifacts, keyframe sequences and keyframes. The sections to follow will described these objects and the interplay between them in more detail.

1.1 The Narrative and Scenes

The RIN data model provides seamless transitions between narrated guided walkthroughs of arbitrary media types and user-explorable content of the media, all in a way that is completely extensible. In the abstract, the RIN data model cart be envisioned as a narrative that runs like a movie with a sequence of scenes that follow one after another (although like a DVD movie, a RIN could be envisioned as also having isolated scenes that are accessed through a main menu). A user cart stop the narrative, explore the environment associated with the current scene (or other scenes if desired), and then resume the narrative where it left off.

A scene is a sequentially-running chunk of the RIN. As a RIN plays end-to-end, the boundaries between scenes may disappear, but in general navigation among scenes can be non-linear. In one implementation, there is also a menu-like start scene that serves as a launching point for a RIN, analogous to the menu of a DVD movie.

However, a scene is really just a logical construct. The actual content or data that constitutes a linear segment of a narrative is contained in objects called RIN segments. As shown in FIG. 1, a scene 102 of a RIN 100 can be composed of a single RIN segment 104, or it can be put together using all or portions of multiple segments 106, 108, 110 (some of which can also be part of a different scene). Thus, a scene can be thought of as references into content that is actually contained in RIN segments. Further, it is possible for a scene from one RIN to reference RIN segments from other RINs. This feature can be used to, for example, create a lightweight summary RIN that references portions of other RINs. Still further, one RIN segment may play a first portion of an experience stream and the next RIN segment plays a remaining portion of the segment. This can be used to enable seamless transitions between scenes, as happens in the scenes of a movie.

In one embodiment of the RIN data model, a provision is also made for including auxiliary data. All entities in the model allow arbitrary auxiliary data to be added to that entity. This data can include, for example (hut without limitation), the following. It can include metadata used to describe the other data. It can also include data that fleshes out the entity, which can include experience-stream specific content. For example, a keyframe entity (i.e., a sub-component of an experience stream, both of which will be described later) can contain an experience-stream-specific snapshot of the experience-stream-specific state. The auxiliary data can also be data that is simply tacked on to a particular entity, for purposes outside the scope of the RIN data model. This data may be used by various tools that process and transform RINs, some cases for purposes quite unrelated to playing of a RIN. For example, the RIN data model can be used to represent annotated regions in video, and there could be auxiliary data that assigns certain semantics to these annotations (say, identifies a "high risk" situation in a security video), that are intended to be consumed by some service that uses this semantic information to make some business workflow decision (say precipitate a security escalation). The RIN data model can use a dictionary entity called Auxiliary Data to store all the above types of data. In the context of the narrative, metadata that is common across the RIN segments, such as, for example, descriptions, authors, and version identifiers, are stored in the narrative's Auxiliary Data entity.

1.2 RIN Segment

Figure 2:
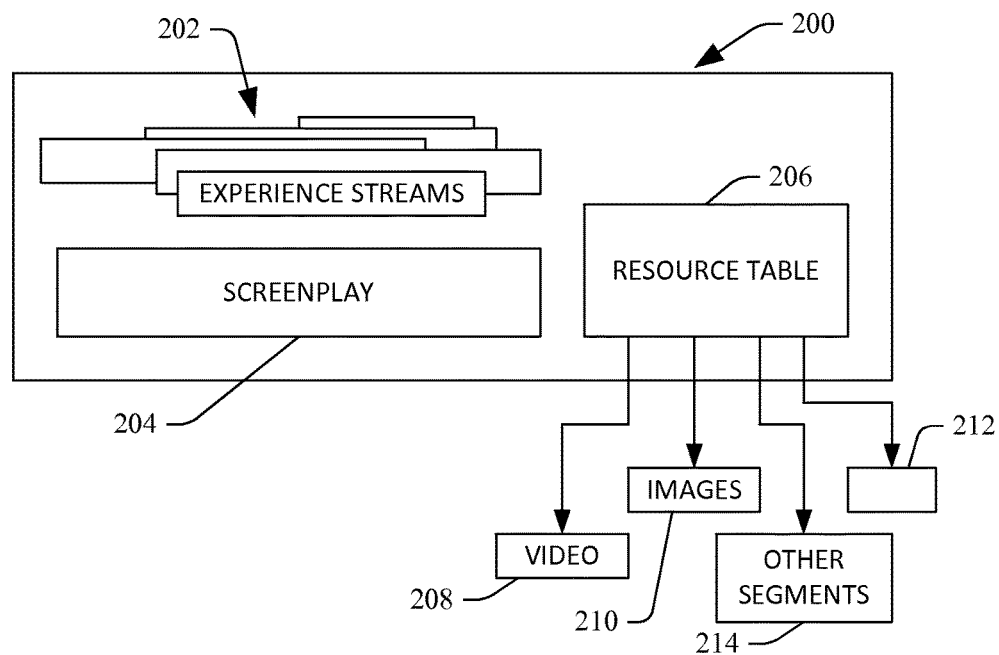
FIG. 2 is a simplified diagram of a RIN segment including one or more experience streams, at least one screenplay and a resource table.

A RIN segment contains references to all the data necessary to orchestrate the appearance and positioning of individual experience streams for a linear portion of a RIN. Referring to FIG. 2, the highest level components of the RIN segment 200 include one or more experience streams 202 (in the form of the streams themselves or retrences to where the streams can be obtained), at least one screenplay 204 and a resource table 206. The RIN segment can also include arbitrary auxiliary data as describe previously. In one implementation, a RIN segment takes the form of a 4-tuple (S, C, O, A). S is a list of references to experience streams; C (which is associated with the screenplay) is a list layout constraints that specify how the experience streams share display screen and audio real estate; O (which is also associated with the screenplay) is a set of orchestration directives (e.g., time coded events); and A (which is associated with the resource table) is a list of named, time coded anchors, used to enable external references.

In general, the experience streams compose to play a linear segment of the narrative. Each experience stream includes data that enables a scripted traversal of a particular environment. Experience streams can play sequentially, or concurrently, or both, with regard to other experience streams. However, the focus at any point of time can be on a single experience stream (such as a PHOTOSYNTH® Synth), with other concurrently playing streams having secondary roles (such as adding overlay video or a narrative track). Experience streams will be described in more detail in a later section.

In general, a screenplay is used to orchestrate the experience streams, dictating their lifetime, how they share screen and audio real estate, and how they transfer events among one another. Only one screenplay can be active at a time. However, in one implementation, multiple screenplays can be included to represent variations of content. For example, a particular screenplay could provide a different language-specific or culture-specific interpretation of the RIN segment from the other included screenplays.

More particularly, a screenplay includes orchestration information that weaves multiple experience streams together into a coherent narrative. The screenplay data is used to control the overall sequence of events and coordinate progress across the experience streams. Thus, it is somewhat analogous to a movie script or an orchestrator conductor's score. The screenplay also includes layout constraints that dictate how the visual and audio elements from the experience streams share display screen space and audio real estate as a function of time. In one implementation, the screenplay also includes embedded text that matches a voiceover narrative, or otherwise textually describes the sequence of events that make up the segment. It is also noted that a screenplay from one RIN segment can reference an experience stream from another RIN segment.

However, the orchestration information associated with the screenplay can go beyond simple timing instructions such as specifying when a particular experience stream starts and ends. For example, this information can include instructions whereby only a portion of an experience stream is played rather than the whole stream, or that interactivity capabilities of the experience stream be disabled. Further, the screenplay orchestration information can include data that enables simple interactivity by binding user actions to an experience stream. For example, if a user "clicks" on a prescribed portion of a display screen, the screenplay may include an instruction which would cause a jump to another RIN segment in another scene, or to shut down a currently running experience stream. Thus, the screenplay enables a variety of features, including non-linear jumps and user interactivity.

An experience stream generally presents a scene from a virtual "viewport" that the user sees or hears (or both) as he or she traverses the environment. For example, in one implementation a 2D viewport is employed with a pre-defined aspect ratio, through which the stream is experienced, as well as, optionally, audio specific to that stream is heard. The term viewport is used loosely, as there may not be any viewing involved. For example, the environment may involve only audio, such as a voiced-over narrative, or a background score.

Figure 3:
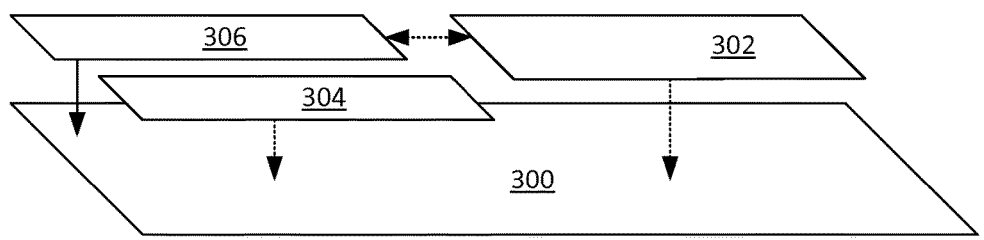
FIG. 3 depicts the relative position and size of an exemplary group of four experience stream viewports.

With regard to the layout constraints, the screenplay includes a list of these constraints which are applicable to the aforementioned viewports created by the experience streams involved in the narrative. In general, these layout constraints indicate the z-order and 2D layout preferences for the viewports, well as their relative sizes. For example, suppose four different experience streams are running concurrently at a point in time in a narrative. Layout constraints for each experience stream dictate the size and positioning of each streams viewport. Referring to FIG. 3, an exemplary configuration of the viewports 300, 302, 304, 306 for each of the four experience streams is shown relative to each other. In addition, in implementations where audio is involved, the layout constraints specify the relative audio mix levels of the experience streams involving audio. These constraints enable the proper use of both screen real estate and audio real estate when the RIN is playing. Further, in one implementation, the relative size and position of an experience stream viewport can change as a function of time. In other words, the layout can be animated.

Thus, each experience stream is a portal into a particular environment. The experience stream projects a view onto the presentation platform's screen and sound system. A narrative is crafted by orchestrating multiple experience streams into a storyline. The RIN segment screenplay includes layout constraints that specify how multiple experience stream viewports share screen and audio real estate as a function of time.

In one implementation, the layout constraints also specify the relative opacity of each experience stream's viewport. Enabling experience streams to present a viewport with transparent backgrounds give great artistic license to authors of RINs. In one implementation, the opacity of a viewport is achieved using a static transparency mask, designated transparent background colors, and relative opacity levels. It is noted that this opacity constrain feature can be used to support transition functions, such as fade-in/fade-out.

With regard to audio layout constraints, in one implementation, these constraints are employed to share and merge audio associated with multiple experience streams. This is conceptually analogous to how display screen real estate is to be shared, and in fact, if one considers 3D sound output, many of the same issues of layout apply to audio as well. For example, in one version of this implementation a relative energy specification is employed, analogous to the previously-described opacity specification, to merge audio from multiple experience streams. Variations in this energy specification over time are permissible, and can be used to facilitate transitions, such as audio fade-in/fade-out.

As for the aforementioned resource table, it is generally a repository for all, or at least most, of the resources referenced in the RIN segment. All external Uniform Resource Identifiers (URIs) referenced in experience streams are resource table entries. Resources that are shared across experience streams are also resource table entries. Referring again to FIG. 2, one exemplary implementation of the resource table includes reference metadata that enables references to external media (e.g., video 208, standard images 210, gigapixel images 212, and so on), or even other RIN segments 214, to be robustly resolved. In some implementations, the metadata also includes hints for intelligently scheduling content downloads; choosing among multiple options if bandwidth becomes a constraint; and pausing a narrative in a graceful manner if there are likely going to be delays due to ongoing content uploads.

1.2.1 RIN Experience Streams

Figure 4:
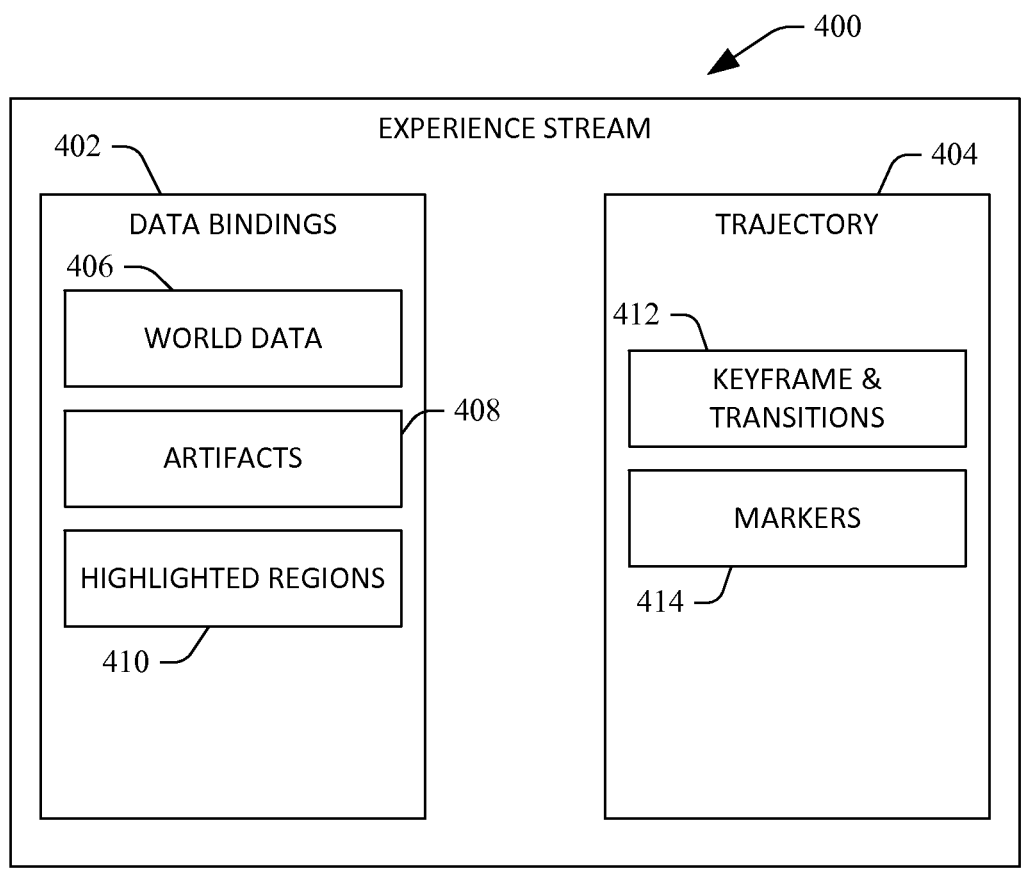
FIG. 4 is a simplified diagram of an experience stream made up of data bindings and a trajectory. The data bindings include environment data, as well as artifacts and highlighted regions. The trajectory includes keyframes and transitions, and markers.

The term experience stream is generally used to refer to a scripted path through a specific environment. In addition, experience streams support pause-and-explore and extensibility aspects of a RIN. In one embodiment illustrated in FIG. 4, an experience stream 400 is made up of data bindings 402 and a trajectory 404. The data bindings include environment data 406, as well as artifacts 408 and highlighted regions 410. The trajectory includes keyframes and transitions 412 and markers 414. An experience stream can also include auxiliary data as describe previously. For example, this auxiliary data can include provider information and world data binding information. Provider information is used in processes that render RINs, as well as processes that enable authoring or processing of RINs, to bind to code that understands the specific experience stream (i.e., that understands the specific environment through which the experience is streaming). The world data binding information defines the concrete instance of the environment over which the experience streams runs.

Formally, in one implementation, an experience stream is represented by a tuple (E, T, A), where E is environmental data, T is the trajectory (which includes a timed path, any instructions to animate the underlying data, and viewport-to-world mapping parameters as will be described shortly), and A refers to any artifacts and region highlights embedded in the environment (as will also be described shortly).

Data bindings refer to static or dynamically queried data that defines and populates the environment through which the experience stream runs. Data bindings include environment data (E), as well as added artifacts and region highlights (A). Together these items provide a very general way to populate and customize arbitrary environments, such as virtual earth, photosynth, multi-resolution images, and even "traditional media" such as images, audio, and video. However, these environments also include domains not traditionally considered as worlds, but which are still nevertheless very useful in conveying different kinds of information. For example, the environment can be a web browser; the World Wide Web, or a subset, such as the Wikipedia; interactive maps; 2D animated scalable vector graphics with text; or a text document; to name a few.

Consider a particular example of data bindings for an image experience stream in which the environment is an image—potentially a very large image such as a gigapixel image. An image experience stream enables a user to traverse an image, embedded with objects that help tell a story. In this case the environmental data defines the image. For example, the environment data could be obtained by accessing a URL of the image. Artifacts are objects logically embedded in the image, perhaps with additional metadata. Finally, highlights identify regions within the image and can change as the narrative progresses. These regions may or may not contain artifacts.

Artifacts and highlights are distinguished from the environmental data as they are specifically included to tell a particular story that makes up the narrative. Both artifacts and highlights may be animated, and their visibility may be controlled as the narrative RIN segment progresses. Artifacts and highlights are embedded in the environment (such as in the underlying image in the case of the foregoing example), and therefore will be correctly positioned and rendered as the user explores the environment. It is the responsibility of an experience stream renderer to correctly render these objects. It is also noted that the environment may be a 3D environment, in which case the artifacts can be 3D objects and the highlights can be 3D regions.

It is further noted that artifacts and region highlights can serve as a way to do content annotation in a very general, extensible way. For example, evolving regions in a video or photosynth can be annotated with arbitrary metadata. Similarly, portions of images, maps, and even audio could be marked up using artifacts and highlights (which can be a sound in the case of audio).

There are several possibilities for locating the data that is needed for rendering an experience stream. This data is used to define the world being explored, including any embedded artifacts. The data could be located in several places. For example, the data can be located within the aforementioned Auxiliary Data of the experience stream itself. The data could also be one or more items in the resource table associated with the RIN segment. In this case, the experience stream would contain resource references to items in the table. The data could also exist as external files referenced by URLs, or the results of a dynamic query to an external service (which may be a front for a database). It is noted that it is not intended that the data be found in just one of these locations. Rather the data can be located in any combination of the foregoing locations, as well as other locations as desired.

The aforementioned trajectory is defined by a set of keyframes. Each keyframe captures the state of the experience at a particular point of time. These times may be in specific units (say seconds), relative units (run from 0.0 to 1.0, which represent start and finish, respectively), or can be gated by external events (say some other experience stream completing). Keyframes in RINs capture the "information state" of an experience (as opposed to keyframes in, for instance, animations, which capture a lower-level visual layout state). An example of an "information state" for a map experience stream would be the world coordinates (e.g., latitude, longitude, elevation) of a region under consideration, as well as additional style (e.g., aerial/road/streetside/ etc.) and camera parameters (e.g., angles, tilt, etc.). Another example of an information state, this time for a relationship graph experience stream, is the graph node under consideration, the properties used to generate the neighboring nodes, and any graph-specific style parameters.

Each keyframe also represents a particular environment-to-viewport mapping at a particular point in time. In the foregoing image example, the mappings are straightforward transformations of rectangular regions in the image to the viewport (for panoramas, the mapping may involve angular regions, depending on the projection). For other kinds of environments, keyframes can take on widely different characteristics.

The keyframes are bundled into keyframe sequences that make up the aforementioned trajectory through the environment. Trajectories are further defined by transitions, which define how inter-keyframe interpolations are done. Transitions can be broadly classified into smooth (continuous) and cut-scene discontinuous) categories, and the interpolation/transition mechanism for each keyframe sequence can vary from one sequence to the next.

A keyframe sequence can be thought of as a timeline, which is where another aspect of a trajectory comes into play—namely markers. Markers are embedded in a trajectory and mark a particular point in the logical sequence of a narrative. They can also have arbitrary metadata associated with them. Markers are used for various purposes, such as indexing content, semantic annotation, as well as generalized synchronization and triggering. For example, context indexing is achieved by searching over embedded and indexed sequence markers. Further, semantic annotation is achieved by associating additional semantics with particular regions of content (such as a particular region of video is a ball in play; or a region of a map is the location of some facility). A trajectory can also include markers that act as logical anchors that refer to external references. These anchors enable named external references to be brought into the narrative at pre-determined points in the trajectory. Still further a marker can be used to trigger a decision point where user input is solicited and the narrative (or even a different narrative) proceeds based on this input. For example, consider a RIN that provides a medical overview of the human body. At a point in the trajectory of an experience stream running in the narrative that is associated with a marker, the FUN is made to automatically pause and solicit whether the user would like to explore a body part (e.g., the kidneys) in more detail. The user indicates he or she would like more in-depth information about the kidneys, and a RIN concerning human kidneys is loaded and played.

A trajectory through a photosynth is easy to envision as a tour through the depicted environment. It is less intuitive to envision a trajectory through other environments such as a video or an audio only environment. As for a video, a trajectory through the world of a video may seem redundant, hut consider that this can include a "Ken Burns" style pan-zoom dive into subsections of video, perhaps slowing down or even reversing time to establish some point. Similarly, one can conceive of a trajectory through an image, especially a very large image, as panning and zooming into portions of an image, possibly accompanied by audio and text sources registered to portions of the image. A trajectory through a pure audio stream may seem contrived at first glance, but it is not always so. For example, a less contrived scenario involving pure audio is an experience stream that traverses through a 3D audio field, generating multi-channel audio as output. Pragmatically, representing pure audio as an experience stream enables manipulation of things like audio narratives and background scores using the same primitive (i.e., the experience stream) as used for other media environments.

It is important to note that a trajectory can be much more than a simple traversal of an existing (pre-defined) environment. Rather, the trajectory can include information that controls the evolution of the environment itself that is specific to the purpose of the RIN. For example, the animation (and visibility) of artifacts is included in the trajectory. The most general view of a trajectory is that it represents the evolution of a user experience—both of the underlying model and of the users view into that model.

Figure 5:
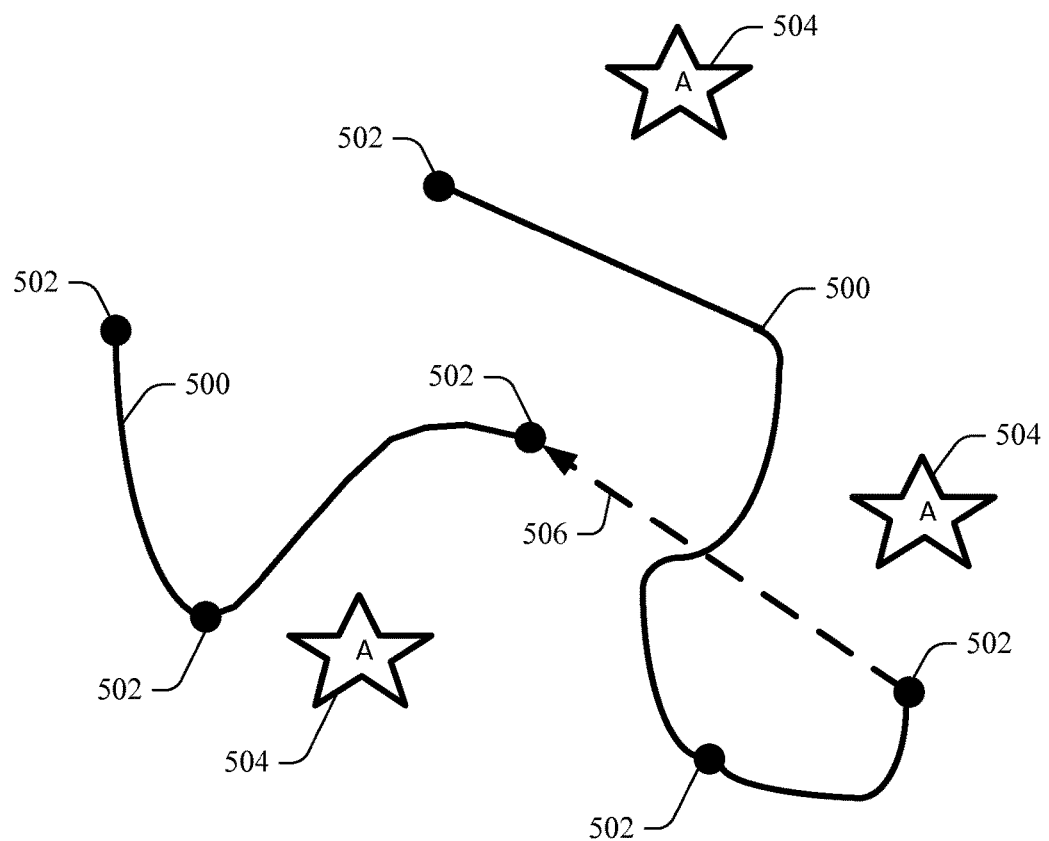
FIG. 5 is a simplified diagram of an experience stream trajectory along with markers, artifacts and highlighted regions.

In view of the foregoing, an experience stream trajectory can be illustrated as shown in FIG. 5. The bolded graphics illustrate a trajectory 500 along with its markers 502 and the stars indicated artifacts or highlighted regions 504. The dashed arrow 506 represents a "hyper jump" or "cut scene"—an abrupt transition, illustrating that an experience stream is not necessarily restricted to a continuous path through an environment.

1.3 RIN System

Figure 6:
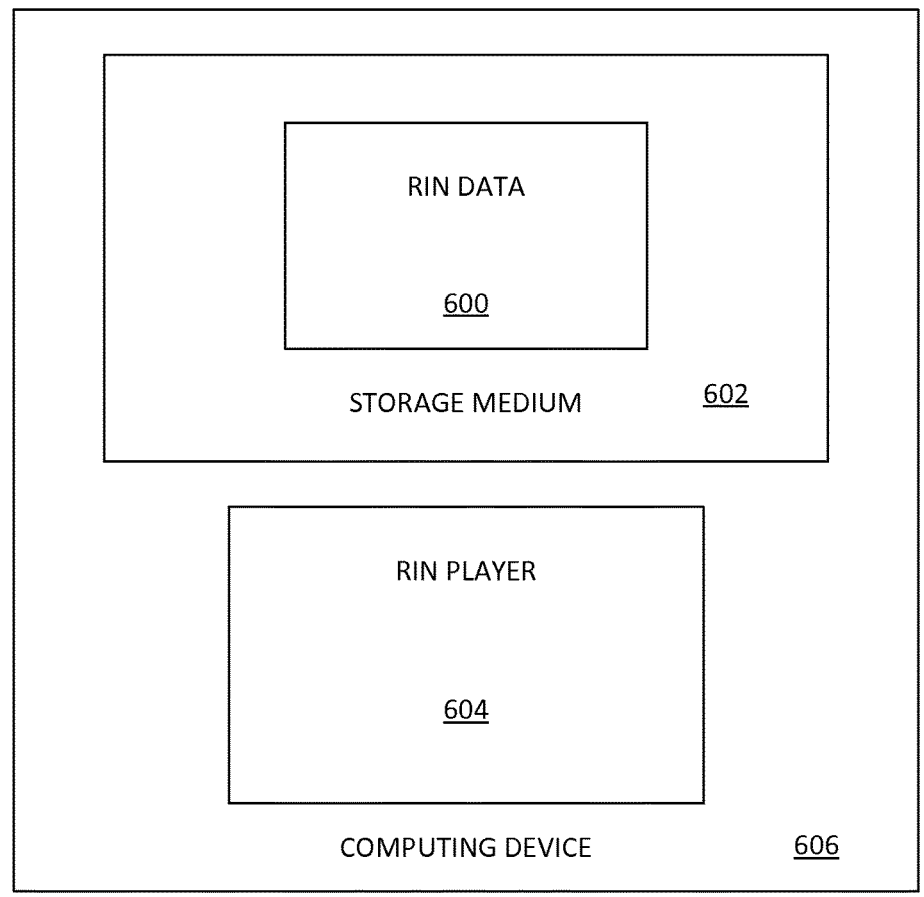
FIG. 6 is a simplified diagram of an embodiment of a system for processing RIN data to provide a narrated traversal of arbitrary media types and user-explorable content of the media.

Given the foregoing RIN data model, the following exemplary system of one embodiment for processing RIN data to provide a narrated traversal of arbitrary media types and user-explorable content of the media can be realized, as illustrated in FIG. 6. In this exemplary RIN system, the RIN data 600 is stored on a computer-readable storage medium 602 (as will be described in more detail later in the exemplary operating environments section) which is accessible during play-time by a RIN player 604 running on a user's computing device 606 (such as one of the computing devices described in the exemplary operating environments section). The RIN data 600 is input to the user's computing device 606 and stored on the computer-readable storage medium 602.

As described previously, this RIN data 600 includes a narrative having a prescribed sequence of scenes, where each scene is made up of one or more RIN segments. Each of the RIN segments includes one or more experience streams (or references thereto), and at least one screenplay. Each experience stream includes data that enables traversing a particular environment created by a one of the aforementioned arbitrary media types whenever the RIN segment is played. In addition, each screenplay includes data to orchestrate when each experience stream starts and stops during the playing of the RIN and to specify how experience streams share display screen space or audio playback configuration.

As for the RIN player 604, this player accesses and processes the RIN data 600 to play a RIN to the user via an audio playback device, or video display device, or both, associated with the user's computing device 606. The player also handles user input, to enable the user to pause and interact with the experience streams that make up the RIN.

2.0 RIN Implementation Environment

Figure 7:
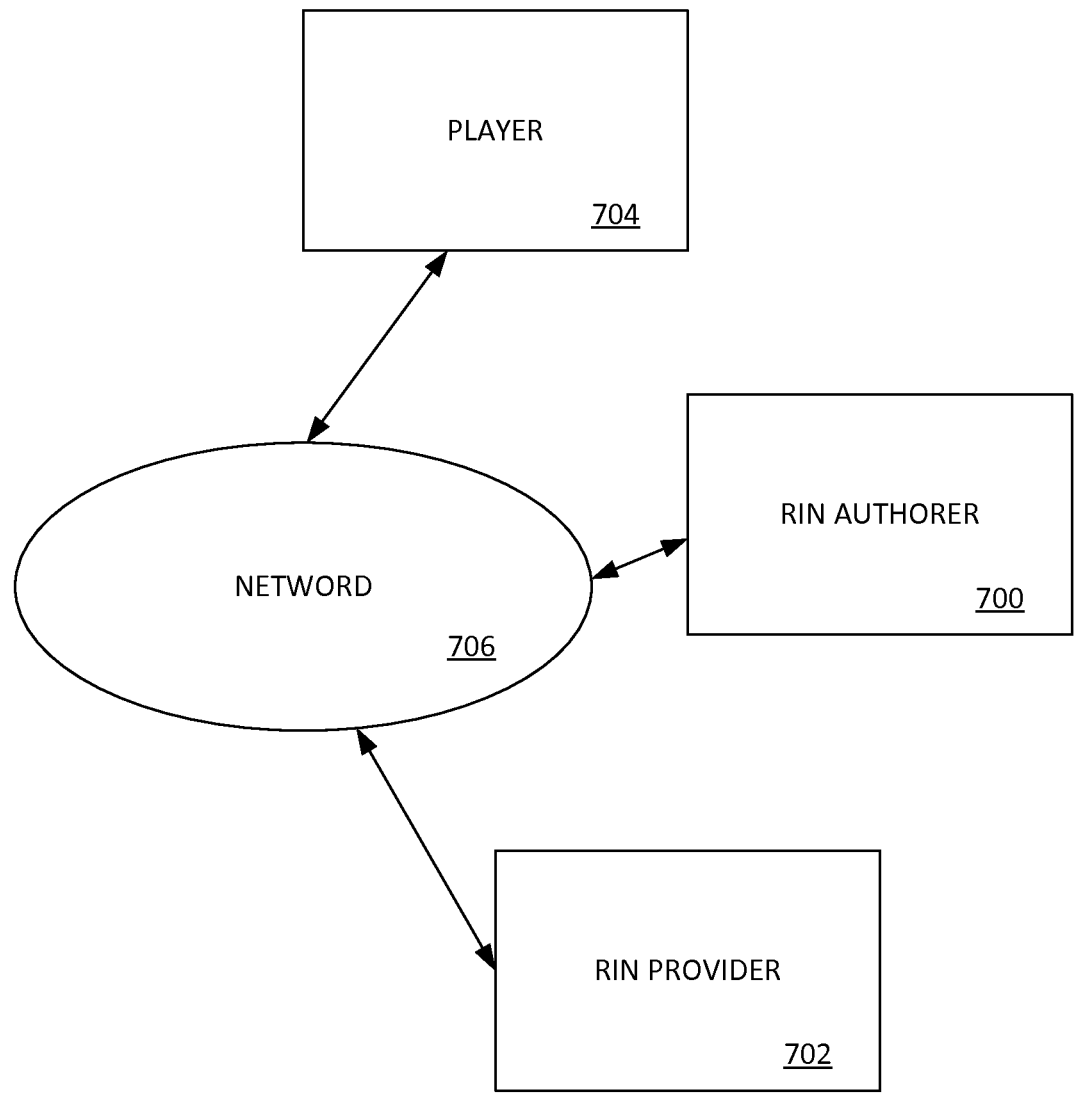
FIG. 7 is a simplified diagram of a generalized and exemplary environment representing one way of implementing the creation, deposit, retention, accessing and playing of RIN.

A generalized and exemplary environment representing one way of implementing the creation, deposit, retention, accessing and playing of RIN is illustrated in FIG. 7. An instance of a RIN constructed in accordance with the previously-described data model is captured in a RIN document or file. This RIN document is considered logically as an integral unit, even though it can be represented in units that are downloaded piecemeal, or even assembled on the fly.

A RIN document can be generated in any number of ways. It could be created manually using an authoring tool. It could be created automatically by a program or service. Or it could be some combination of the above. While the specifics on how RIN documents are authored is beyond the scope of this application, authorers are collectively represented in FIG. 7 by the authorer block 700.

RIN documents, once authored are deposited with one or more RIN providers as collectively represented by the RIN provider block 702 in FIG. 7. The purpose of a RIN provider is to retain and provide RINs, on demand, to one or more instances of a RIN player. While the specifics on the operation of a RIN provider is beyond the scope of this application, it is noted that in one implementation, a RIN provider has a repository of multiple RINs and provides a search capability a user can employ to find a desired RIN. The RIN player or players are represented by the RIN player block 704 in FIG. 7. A RIN player platform for playing RINs will be described in more detail in the sections to follow.

In the example of FIG. 7, the RIN authorers, RIN providers and RIN player are in communication over a computer network 706, such as the Internet or a proprietary intranet. However, this need not be the case. For example, in other implementations any one or more of the RIN authorers, RIN providers and RIN players can reside locally such that communications between them is direct, rather than through a computer network.

3.0 RIN Player Platform

Together, the previously-described RIN data model and the RIN player platform embodiments described herein enable a very broad class of rich interactive applications in a device independent way that is also platform technology proof and can be extended to new kinds of interactive visualization technologies.

Figure 8:
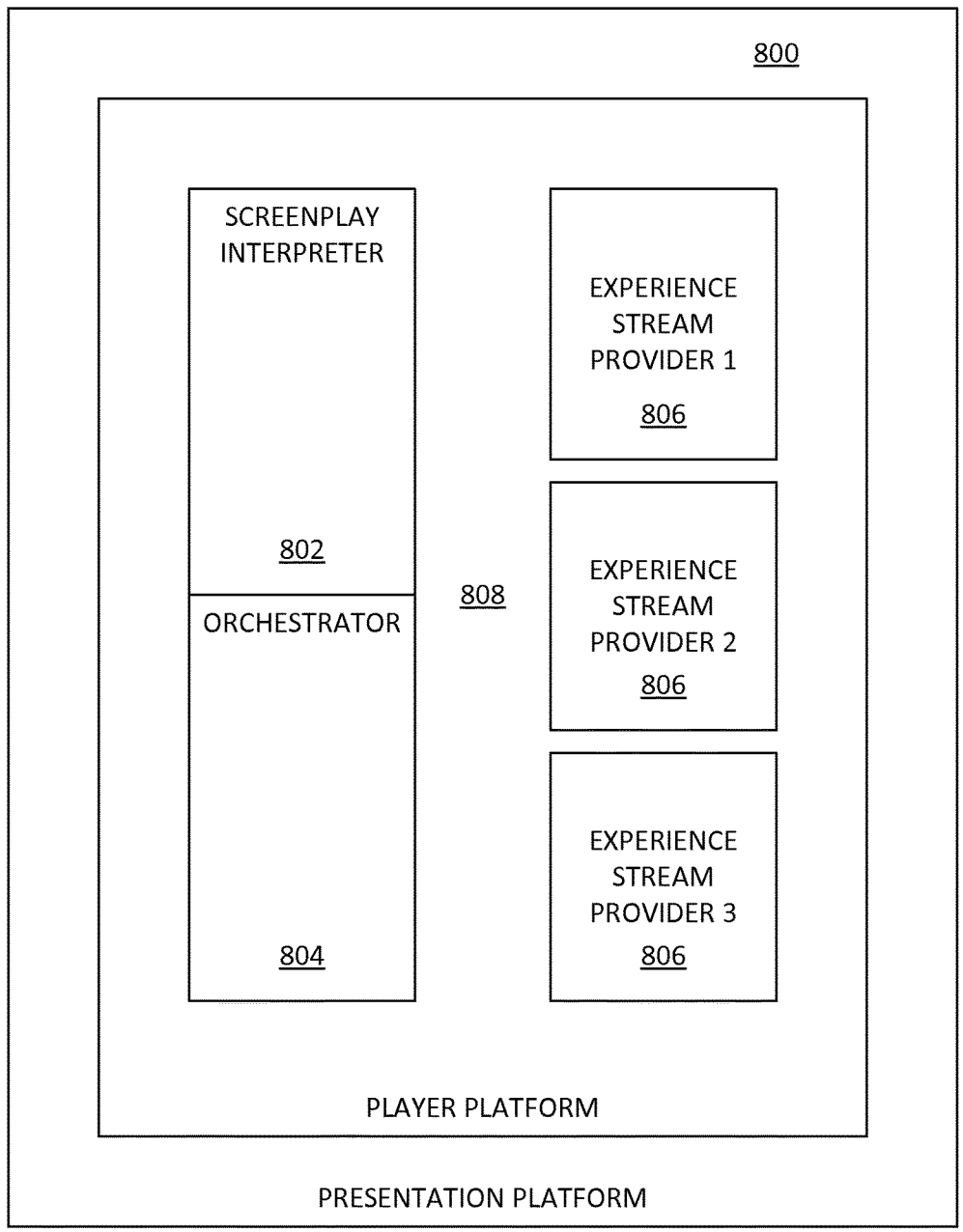
FIG. 8 is a simplified diagram of a generalized and exemplary player platform.

A generalized and exemplary platform representing one way of implementing the RIN player is illustrated in FIG. 8. The player platform 808 is built on an existing presentation platform 800 such as, but not limited to, Microsoft Corporation's Silverlight™ or Adobe Systems Incorporated's Flash®, or a system supporting HTML5.0 and/or Javascript that is running on a uses computing device (such as will be described in more detail in the upcoming exemplary operating environments section). The presentation platform provides a user interface that includes a viewing window in which the previously described experience stream viewports are displayed, and user input capability via conventional methods (e.g., touch screen, keyboard, mouse, and so on). For example, a user can select objects displayed in a viewport using the aforementioned input capability. In one implementation, a user can employ the user interface to pause the RIN and explore the environment manually. It is further noted that the presentation platform is not restricted to providing traditional 2D visual and standard audio playback of a narrative. In some embodiments, the playback is in 3D, or multi-channel audio, or both. Further, in some embodiments haptic interfaces are available as a way to more fully experience the experience streams.

In one embodiment, the user employs the presentation platform to access a RIN from a RIN provider and to download the chosen RIN to the user's computing device. As indicated previously, the entire RIN document can be downloaded, or portion of the RIN document can be downloaded as needed. The latter scenario is particularly applicable to embodiments where portions of a narrative are generated dynamically, or contents of existing components are modified on the fly (such as when the user is allowed to interact and modify the contents of the narrative). It is noted, however, that additional RINs might be called out and downloaded as part of the playing of the chosen RIN without the user being involved. Further, in some embodiments, a RIN can be automatically provided independent of a user request (although perhaps based on some other user activity that triggers the RIN to be provided).

The platform itself includes a pluggable screenplay interpreter module 802, an orchestrator module 804 and one or more pluggable experience stream provider modules 806 (three of which are shown). The orchestrator 804 is used to load the screenplay (which is the screenplay selected in the manner to be described shortly for implementations where the RIN segment includes multiple screenplays), and to identify and load the screenplay interpreter 802 that understands how to interpret the particular format of the screenplay. There can be multiple pluggable screenplay interpreters 802 available to the orchestrator 804. The screenplay interpreter 802 identifies the experience stream providers 806 needed to play the experience streams contained in the RIN document. Generally, an experience stream provider 806 is a module that can render a particular experience stream. Each experience stream in the RIN document includes information that identifies its provider 806. Making the experience stream providers 806 pluggable has the advantage of accommodating future experience stream types without recompilation.

The screenplay interpreter 802 instructs the orchestrator 804 to load (plug-in) the identified experience stream providers 806, and to have them create instances of the associated experience streams using the experience stream data and resource table in the RIN document. As indicated previously, the metadata in the resource table can include hints for intelligently scheduling content downloads; choosing among multiple options if bandwidth becomes a constraint; and pausing a narrative in a graceful manner if there are likely going to be delays due to ongoing content downloads. It is the task of an experience stream provider 806 to employ experience stream data (in particular the aforementioned anchor markers) and resource table metadata to download the needed external media in order to create an instance of the experience stream associated with the provider. In one embodiment this involves employing a preloading logic to preload media in the chronological order that it is needed during the playing of the associated experience stream and in an intelligent manner giving priority to media to be used in the immediate future.

The screenplay interpreter 802 further consults the orchestration information found in the screenplay from the RIN document to determine the layout, and when each of the individual experience streams are to start and end playing on the presentation platform 800. In implementations where a RIN segment includes more than one screenplay, the screenplay that is used is selected by the orchestrator 804 based on a RIN URI or a default setting as will be described in more detail later in this description. It is also the screenplay interpreter's 802 job to instruct the orchestrator 804 as to when to commence and stop playing each prepared instance of the experience streams. This is done on an on-going basis as the narrative plays. It is noted that the screenplay interpreter's 802 instructions to the orchestrator 804 will depend not only on the timing information extracted from the screenplay, but also as to whether the user has paused the narrative in order to explore the environment. It is still further the screenplay interpreter's 802 job instruct the orchestrator 804 as to the layout (visual and/or audio) of each experience stream that is running. This is also done on an on-going basis based on the screenplay (which as described previously includes the layout constraints for each experience stream).

As described previously, experience streams can themselves trigger changes in player state, including jumping to different points in a narrative, launching a different screenplay in the current narrative, and launching a different segment in the same or different narrative. To facilitate and coordinate this feature, there is an eventing and state sharing mechanism that enables experience streams to communicate with each other and the screenplay interpreter 802. The screenplay interpreter 802 manages the communication between experience streams and implements the needed actions in the manner described above. Thus, a current state of currently playing experience streams is reported and stored via the eventing and state sharing mechanism, and whenever an experience stream includes a triggering event that involves a cessation of the playing of currently playing experience streams and starting the playing of one or more of the same streams at a different point, or starting the playing of different streams, or both, the screenplay interpreter module 802 instructs the orchestrator module 804 to cause the experience stream provider modules 806 to accomplish the stopping and starting of experience streams in accordance with said triggering event based on the current states of the experience stream currently stored via the eventing and state sharing mechanism.

As can be deemed from the foregoing description of the screenplay interpreter 802, the orchestrator 804 is tasked with loading and initiating the experience stream providers 806. It is also tasked with controlling the experience stream providers 806 so as to start and stop the experience streams, as well as controlling the layout of the experience streams via the presentation platform 800. Thus, if the user pauses the RIN, or the has to be paused to allow for the download and buffering of RIN segments or associated media, the orchestrator 804 will cause the experience stream providers 806 associated with the currently playing experience streams to stop based on an instruction from the screenplay interpreter 802. Likewise, when the user inputs a restart command or the download and buffering of the RIN data or associated media is complete to a prescribed degree, the screenplay interpreter 802 sends instructions to restart the experience streams (possibly from where they left off after the paused RIN is resumed), the orchestrator 804 will cause the experience stream providers 806 to resume playing the paused experience streams.

It is noted that as experience stream provider interfaces can change, as well as the presentation platform interface, the orchestrator 804 may have to be changed to accommodate the new configurations.

Figure 9:
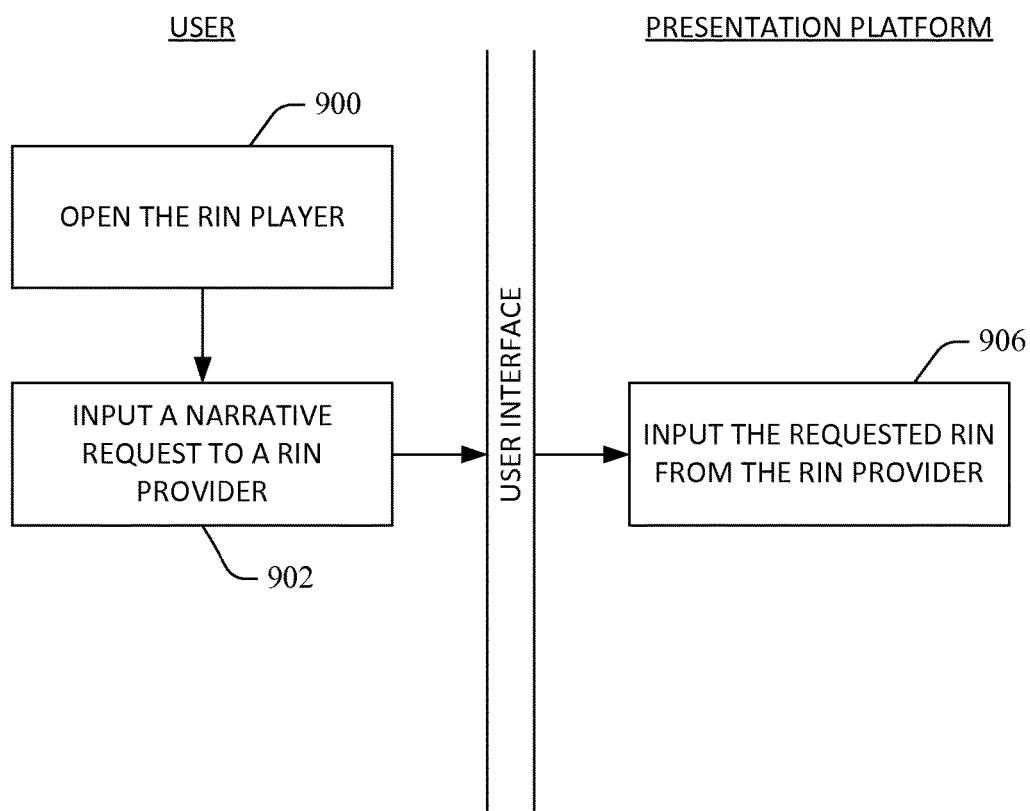
FIG. 9 is a flow diagram generally outlining one embodiment of a process for playing a RIN.

In view of the foregoing, one general implementation of a process for playing a RIN is accomplished as follows. Referring to FIG. 9, the user opens the RIN player on his or her computing device 900. The player can be resident on the user's computing device, or in another implementation, the player is contacted via a computer network and opened, for instance, in a browser program running on the user's computing device. This latter scenario can be advantageous when the user's computing device is a mobile device that does not have the computing power or storage space to house the RIN player.

The user then inputs a narrative request to a RIN provider (902). This request can take the form of a result selected from a list of RINs returned by a RIN provider in response to a query from the user. The presentation platform then inputs the requested RIN from the RIN provider (904).

Figure 10A:
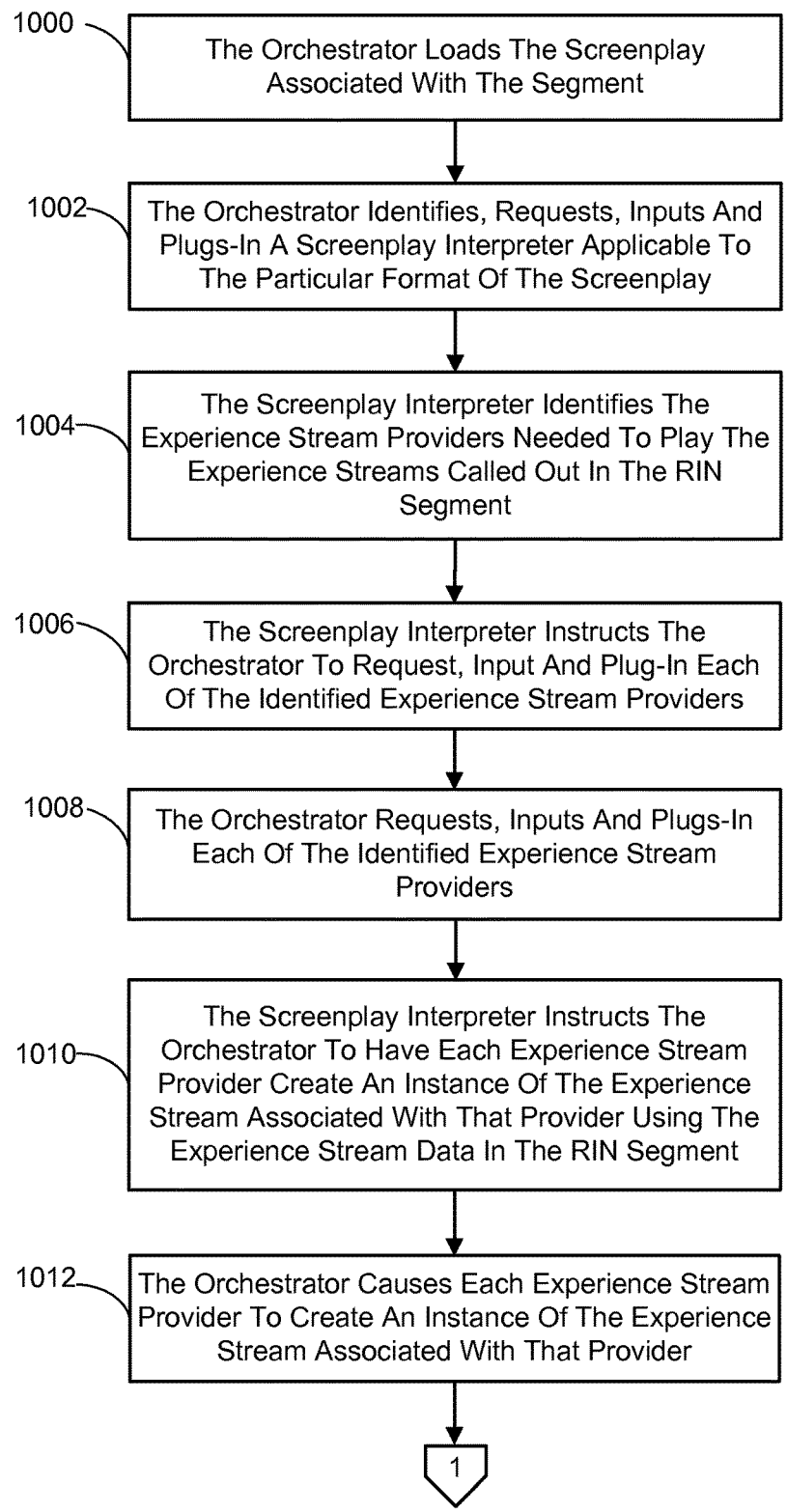
FIGS. 10A-B are a continuing flow diagram generally outlining an implementation of the part of the process of FIG. 9 involving playing a RIN segment.
Figure 10B:
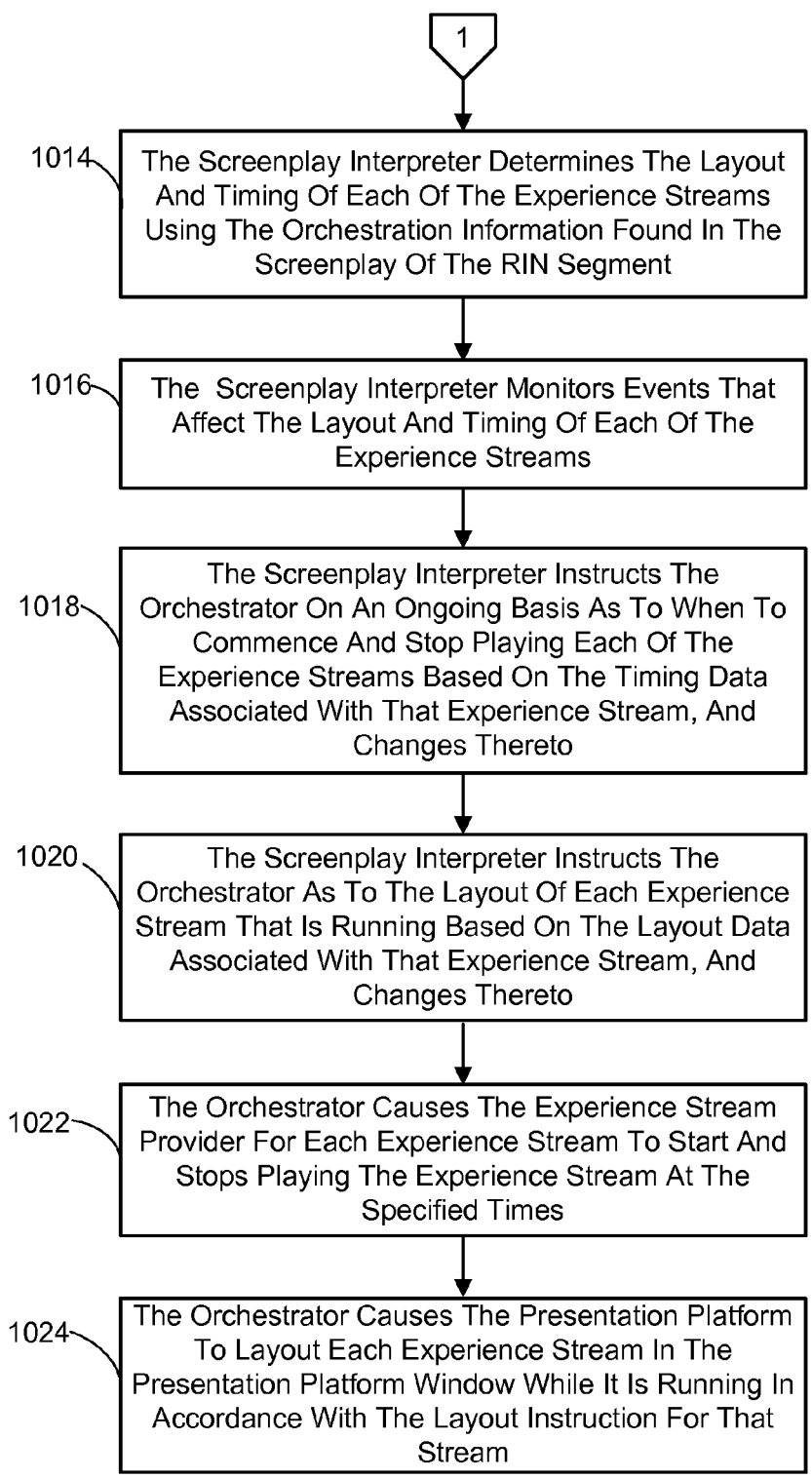

Referring now to FIGS. 10A-B, one implementation of a process for playing each RIN segment of an inputted RIN is presented. First, the orchestrator loads the screenplay associated with the segment (1000). The orchestrator then identifies, requests (via the presentation platform), inputs (via the presentation platform) and plugs-in a screenplay interpreter applicable to the particular format of the screenplay (1002). The pluggable screenplay interpreter can be obtained from a RIN provider.

The screenplay interpreter then identifies the experience stream providers needed to play the experience streams called out in the RIN segment (1004). Next, the screenplay interpreter instructs the orchestrator to request (via the presentation platform), input (via the presentation platform) and plug-in each of the identified experience stream providers (1006). In response, the orchestrator requests, inputs and plugs-in each of the identified experience stream providers (1008). The experience stream providers can be obtained from a RIN provider. The screenplay interpreter also instructs the orchestrator to have each experience stream provider create an instance of the experience stream associated with that provider using the experience stream data in the RIN segment (1010). In response, the orchestrator causes each experience stream provider to create an instance of the experience stream associated with that provider (1012).

Next, the screenplay interpreter determines the layout and timing of each of the experience streams using the orchestration information found in the screenplay of the RIN segment (1014), and monitors events that affect the layout and timing of each of the experience streams (1016). For example, communications from the experience streams via the eventing and state sharing mechanism are monitored for events affecting the layout and timing of the experience streams. In addition, communications from the user, such as a pause command, are monitored as this will clearly have an effect of the timing of the experience streams. Still further, the download status of RIN segments and the media needed to play the segments is monitored as the RIN may need to be paused (and thus affecting the experience stream timing) if needed components are not available.

The screenplay interpreter instructs the orchestrator on an ongoing basis as to when to commence and stop playing each of the experience streams based on the timing data associated with that experience stream, and changes thereto (1018). In addition, the screenplay interpreter instructs the orchestrator as to the layout (visual and/or audio) of each experience stream that is running based on the layout data associated with that experience stream, and changes thereto (1020). In response, for each experience stream, the orchestrator causes the associated experience stream provider to start and stop playing the experience stream at the specified times (1022), and to cause the presentation platform to layout each experience stream in the presentation platform window while it is running in accordance with the layout instruction for that stream (1024).

3.1 Exemplary RIN Player

Figure 11:
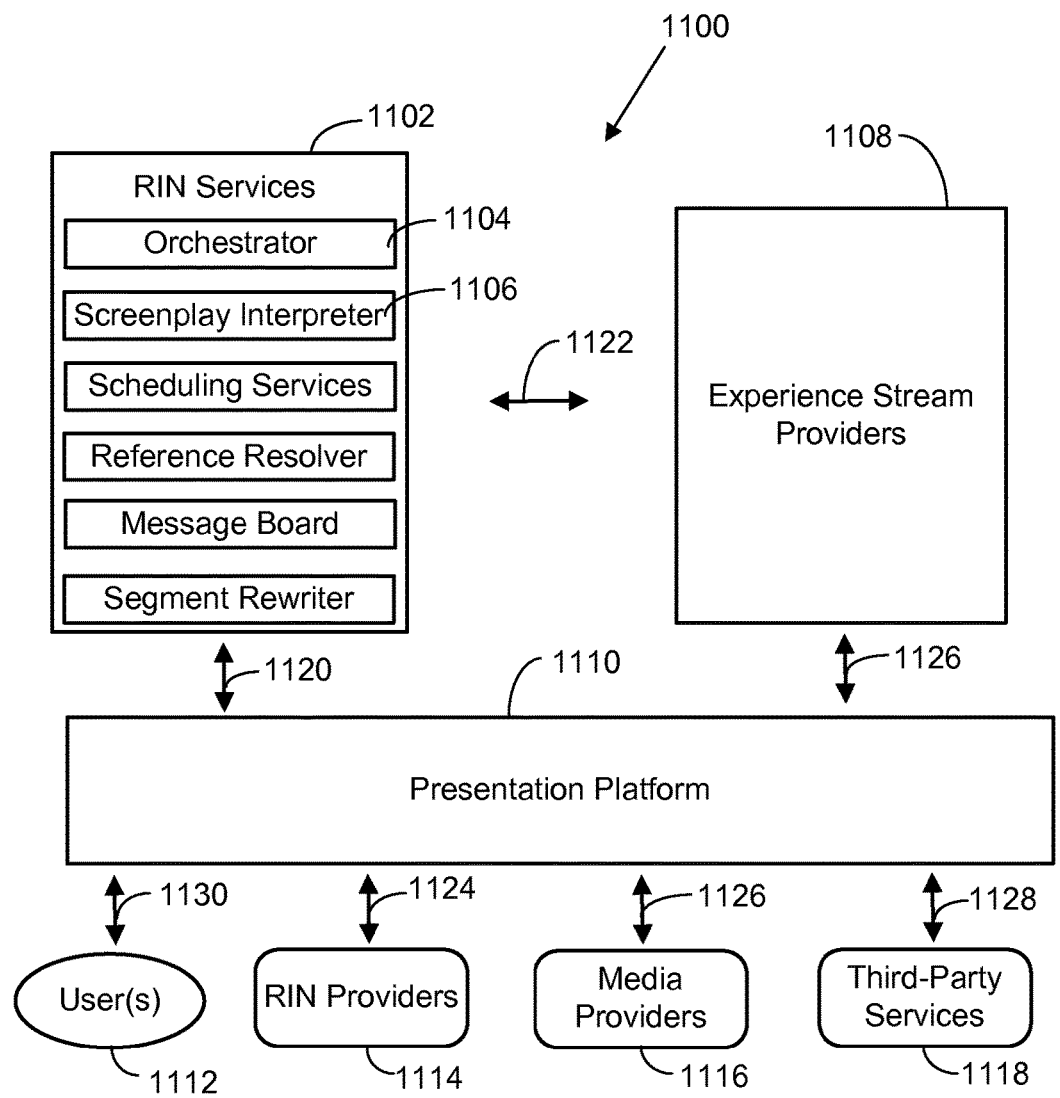
FIG. 11 is a simplified diagram of an exemplary RIN player.

In view of the foregoing, the following sections provide a more detailed description of one exemplary embodiment of a RIN player. Referring to FIG. 11, the components that make up the player 1100 include a set of RIN services 1102. These include those that are built into the player, such as the previously-described orchestrator 1104, as well as those services that are dynamically pluggable, such as the previously-described screenplay interpreter 1106. Together these services execute the RIN as well as provide common services to experience stream providers 1108.

With regard to the set of experience stream providers 1108, each provider is embodied as dynamically loadable code that implements a particular experience stream. Each provider 1108 instantiates one more instances of experience streams (each representing one instance of an experience stream object). In addition, there are experience streams that perform general functions such as providing player controls to pause/play/seek narratives. Note that in one implementation, these are implemented as experience streams, and not burned into the player. However, other implementations can choose to hardcode some standard controls—although logically these would still be considered implemented within an experience stream.

The foregoing components are implemented for a particular presentation platform 1110. However, the RIN data itself does not depend on any specific platform. As indicated previously, examples of presentation platforms include: Microsoft® Silverlight™; Microsoft® Silverlight™ for mobile devices; Microsoft Windows Presentation Foundation™; Adobe® Flash™; Apple® iOS™; Google® Android™ and Standard HTML5 and/or Javascript on multiple Browser implementations.

User(s) 1112 interact with the player 1100 via the presentation platform 1110. In addition, as indicated previously, RIN providers 1114 interface with the player 1100 (also via the presentation platform). RIN providers 1114 are resources on a computer network or local storage that provide the RIN. It can be a simple XML file containing the RIN data, or it could be a database accessed over the network (e.g., the Internet or a proprietary intranet). Further, media providers 1116 interface with the player 1100 (also via the presentation platform). These media providers are services that host media referenced in RINs. It is noted that while the RIN providers 1114 and media providers 1116 are shown a separate entities in FIG. 11, they could alternately be the same entity. In one implementation, the media providers 1116 are a heterogeneous set of services each optimized for serving particular kinds of content (such as smooth-streamed video, photosynths, map tiles, deep zoom images). However, they could alternately be arranged along organizational or content-ownership boundaries. Still further, third-party services 1118 interface with the player 1100 via the presentation platform. Third-party services are services that experience streams reference directly or indirectly (e.g., via RIN services 1102). For example, a maps-based experience stream may reference a third-party address geocoding service.

The foregoing player and external components interact through a set of interfaces. For example, the RIN services 1102 interact with the presentation platform 1110 via a RIN services-to-presentation platform interface 1120, which includes user interaction and interaction with system and network services. This interface 1120 is not specific to RIN. RIN services 1102 also interact with the experience stream providers 1108. This is done via RIN services-to-experience stream provider interfaces 1122. The interactions are specific to the kind of service. For example, the orchestrator would request specific experience stream instances to be loaded, paused, seeked to specific points, or played. The presentation platform 1110 interfaces with the RIN providers 1114 via a presentation platform-to-RIN provider interface 1124. This is an appropriate protocol and API for retrieving the RIN. For example, in one implementation, it would be a URI or data base query (such as an odata query) whose response contains the RIN (or parts of it, downloaded on demand). This interface 1124 is also not specific to RIN. The presentation platform 1110 interfaces with the media providers 1116, as well as the experience stream providers 1108, via a presentation platform-to-provider interface 1126. This interface 1126 is similar to the presentation platform-to-RIN provider interface 1124, except the scope is any media that is references by the RIN (typically referenced within experience streams). The presentation platform 1110 interfaces with the third party services 1118 via a presentation platform-to-third-party services interface 1128. In one implementation, this interface 1128 is an appropriate industry standard interface, such as web-service interface. This too is not specific to RIN. Finally, the presentation platform 1110 interfaces with the user(s) 1112 via a presentation platform-to-user interface 1130. In one implementation, this is a UX exposed by the platform 1110, and includes common user interaction mechanisms such as using the mouse, keyboard and touch, as well as ways for presenting media to the users via displays and audio. This interface is also not specific to RIN. The presentation platform 1110 is responsible for routing user interaction requests to the appropriate target, which is typically an experience stream instance.

3.2 Playing a RIN

In view of the foregoing, one implementation of a process for playing a RIN is accomplished as follows.

3.2.1 Processing a RIN URI

A RIN Uniform Resource Identifier (URI) encodes the following information:

URI to RIN file.
(Optional) Segment ID.
(Optional) Screenplay ID.
(Optional) Start offset or marker.
(Optional) End offset of marker.
(Optional) Annotation specifications that overlay a set of annotations on top of the RIN (Optional) A template or base RIN URI to be use used as a basis for the RIN,
(Optional) Execution modifier parameters such as whether to launch in full screen, whether to permit interaction, etc.

The first task for the player is to process a RIN URI. The Orchestrator is responsible for this task, and in one implementation accomplishes RIN URI processing as follows:
Extracting the location of the RIN data model from the URI.
Retrieving the RIN data model instance.
If specified in the URI, extracting the start segment ID, else using the default start segment ID specified in the narrative header.
Retrieving the start segment.
If specified in the URI, extracting the screenplay ID, else using the default screenplay ID specified in the segment header.
Extracting any other additional parameters specified in the URI.
Loading the RIN segment, as described in the next section.
Playing the RIN segment, using any optional parameters specified to modify start behavior (for example starting in the paused or play state; jumping to an offset/marker in the RIN, and so on).

3.2.2 Loading a RIN Segment

Loading a RIN segment includes binding to referenced experience stream providers and possibly creating experience stream instances. The orchestrator is responsible for this task, and in one implementation this RIN segment loading is accomplished as follows:
Identifying the screenplay interpreter component for the selected screenplay (see the previous section on how the screenplay ID is identified given a RIN URI). Loading the screenplay interpreter component and create an instance of a screenplay interpreter, bound to the data in the selected screenplay in the data model. Note that the player typically has a standard screenplay interpreter that can be overridden by a custom interpreter specified in an associated screenplay experience stream (every screenplay has an associated screenplay experience stream, which includes provider information).
Loading any special experience stream providers such as the player controls experience stream or a credits experience stream. Instantiating instances of these experience streams.
Loading providers for all experience streams specified in the segment, using the provider information to find matching components. Note that this can be alternatively deferred to play time to minimize load time and allocated resources.
Processing any additional directives and if needed start playing the RIN possibly at a specified offset.

Regarding the above-described loading of the required experience stream providers, these are code modules that implement the experience stream. The loading involves loading the necessary libraries required to render the experience stream. As mentioned above, the loading of the provider required for instantiating an experience stream instance can be deferred to the point in time where the instance is actually required. The mechanism by which these providers are located and loaded depends on the specific implementation of the player, and in particular the specific presentation platform used. In some cases, dynamic loading may not be possible or desirable. In these cases all the providers needed for a class of RINs may be packaged with a particular flavor of the player.

3.2.3 Instantiating Instances of Experience Streams

Next, instances of experience streams are instantiated. To create an experience stream instance, the orchestrator instructs the experience stream provider to construct an instance, passing in a representation of the experience stream data model. Experience stream instances are objects with methods and properties. The methods include such verbs as Load and Play and Pause, and Seek, 3.2.4 Playing a RIN Segment Once instances of the experience streams are instantiated, the RIN segment can be played. In this context it is noted that the player has three main states once it has loaded a particular RIN Segment—namely the paused state, the playing state and the buffering state.

3.2.4.1 Player States

In the paused state, the narrative timeline for the segment is paused. The user is free to interact with experience streams. The user must explicitly indicate a desire to switch out of paused state.

In the playing state, the narrative timeline for the segment is running. In this state, the user is passively watching the narrative segment play.

In the buffering state, the narrative timeline for the segment is temporarily suspended while awaiting required resources needed to play the narrative (such as pre-buffering a video, or loading an experience stream instance). The user cannot interact with content. Unlike paused and playing states, the buffering state is not explicitly set by user action. Rather the player spontaneously enters this state. Upon the buffering conditions being fulfilled the segment automatically resumes playing.

There are also transition states, when the player is transitioning between paused and playing, as well as sub-states, where the player is seeking to a different location in the segment.

3.2.4.2 Preparing to Play a RIN Segment

Preparing to play a RIN segment occurs whenever the player needs to switch from the paused to playing state. It is noted that in one version, the initial state of the player once a RIN segment is loaded is paused. However, one of the aforementioned optional fields (if specified) in the RIN URI may instruct the orchestrator to switch from the paused state to the playing state on launching the RIN segment. In one implementation, preparing to play a RIN segment is accomplished as described below:
The orchestrator informs the screenplay interpreter to get ready to start playing the segment at a particular narrative time offset (which may be an absolute time or a time relative to a marker in a screenplay experience stream).
The screenplay interpreter consults the screenplay (and associated screenplay experience stream data) in the RIN file, and determines the set of experience stream instances that need to be instantiated. The screenplay interpreter requests the orchestrator to load the required experience stream instances and prepare each of them to start playing at their own relative time offsets.
The orchestrator instructs the experience stream providers to create (or re-use) instances of the experience streams, and calls each experience stream instance's seek method to ask it to prepare to start playing at the appropriate time offset. The required screen and audio real estate (screen boundaries, audio relative volume and so on) are also provided by the screenplay interpreter and passed on by the orchestrator to the experience stream instances.
Each loaded experience stream when asked to seek is responsible for loading and buffering any resources it needs, so that once this process is complete, it is ready to start rendering the narrative at the particular offset.

The orchestrator keeps track of outstanding requests to load and seek the required experience stream instances, and keeps the player in the buffering state while this process is happening, 3.2.4.3 Starting to Play a RIN Segment Once all the Experience streams instances are ready to play, the orchestrator instructs each of the experience stream instances to start playing, and maintains a narrative logical time clock. While the player is in the play state, the screenplay interpreter may spontaneously instruct the orchestrator to change the screen layout and/or audio characteristics of individual active experience stream instances. It may even instruct new instances to be made ready to play, or existing instances to be killed, all white the player is in the play state.

It is up to each experience stream instance to determine what to render at a particular time. The experience stream instance will typically refer to data from its corresponding data model experience stream instance, using the keyframe data to determine how to evolve its internal state and what world-to-viewport transformation to use. This information is captured in its keyframe data.

It is also up to individual experience stream instances to pre-buffer media needed so that play is not interrupted if it can be helped. Any resources required by the experience stream are stored (or references to the resource stored) in the resource table of the RIN. The orchestrator makes available a copy of this resource table to each experience stream instance. Experience stream instances can make use of the reference resolver service to resolve references. The reference resolver service takes a list of resource references and does a bulk resolution of them, returning a list of resolved URIs that the experience stream instance can use. Experience stream instances can leverage the scheduling services to request pre-buffering of items.

3.3 Pausing a RIN Segment

It is noted that if at any point while playing an experience stream instance cannot keep up with the rendering (for example when it needs some data or piece of media at a particular time and this data/media does not arrive in time), the experience stream instance can signal the orchestrator to switch the player into the buffering state. This temporarily pauses narrative logical time, and the gives the experience stream instance time to catch up. When the experience stream instance is caught up it instructs the orchestrator that it can resume playing (however it is possible that in the interim another experience stream instance has requested buffering; it is the responsibility of the orchestrator to coordinate different buffering requests and maintain a coherent player state).

Additionally, a pause may be explicitly or implicitly invoked by the user. For example, the user can also explicitly trigger the pause state by clicking on a pause button in the special player controls experience stream instance. Further, in one implementation, during the playing state, any indication by the user of the need to interact (moving the mouse, touching the display, entering something on the keyboard) is intercepted by the orchestrator and results in an automatic transition to the pause state.

To pause the player, the orchestrator stops the narrative logical time clock, and instructs each of the experience stream instances to pause by calling their pause method. Once paused, non-occluded experience streams are responsible for handling their own user interaction events. The special player controls experience stream instance also can have standard (or dockable) user interaction controls (such as for pan, zoom, etc.) that when clicked raise events that the orchestrator route to the experience stream instance that has input focus. These controls will be enabled when the player is in paused state.

3.4 Additional Considerations 3.4.1 Managing Experience Stream Lifetimes

When the Narrative is in PLAY mode, it is the responsibility of the screenplay interpreter to keep track of when particular experience streams need to be pre-loaded and when it is time to make them go away. It needs to look ahead in narrative time, and give advance notification to the orchestrator to load and prep experience stream instances to play. When the player seeks to a particular point in the narrative, it is the screenplay interpreter that determines which experience stream instances need to be active in order to play that part of the narrative. This information is encoded in the screenplay found in the RIN.

3.4.2 Leveraging Shared State

As described in general previously, the Player maintains a shared message board, which all experience stream instances access to get and post messages. In one implementation, these messages are identified by a string identifier, and can be either typed (e.g., schematized) or untyped (e.g., an arbitrary XML element). This message board can be used to implement logic where the narrative evolves taking into account the past state of the narrative, including user interaction with experience stream instances. The semantics of this interaction is completely up to the experience stream instances. There is no dictated structure for how this message board is to be used. This is by design, as it enables a wide variety of use cases. Exemplary cases include where an experience stream instance records experience stream-specific user choices that are used for the remainder of the narrative, and where an experience stream instance publishes a piece of data to the message board that is consumed by another experience stream instance. The ID and type of this piece of data is agreed upon ahead of time.

3.4.3 Dynamic Composition of RINs

An experience stream instance may consult services to obtain a template to a RIN segment (e.g., a kind of skeleton RIN segment instance) and pass this to a RIN segment rewriting service to flesh out and dynamically generate a RIN segment. A dynamically generated (by a segment rewriter service) URI associated with this generated RIN segment can be passed by the experience stream instance to the orchestrator to launch a dynamically generated RIN. The segment rewriter is an example of a pluggable service that is dynamically instantiated. However, it is not intended that the segment rewriter be considered the only possible pluggable or third-party service. Rather, an experience stream instance can contact any appropriate third-party or local pluggable service to create dynamic content that can subsequently be executed by the player.

4.0 Exemplary Operating Environments

Figure 12:
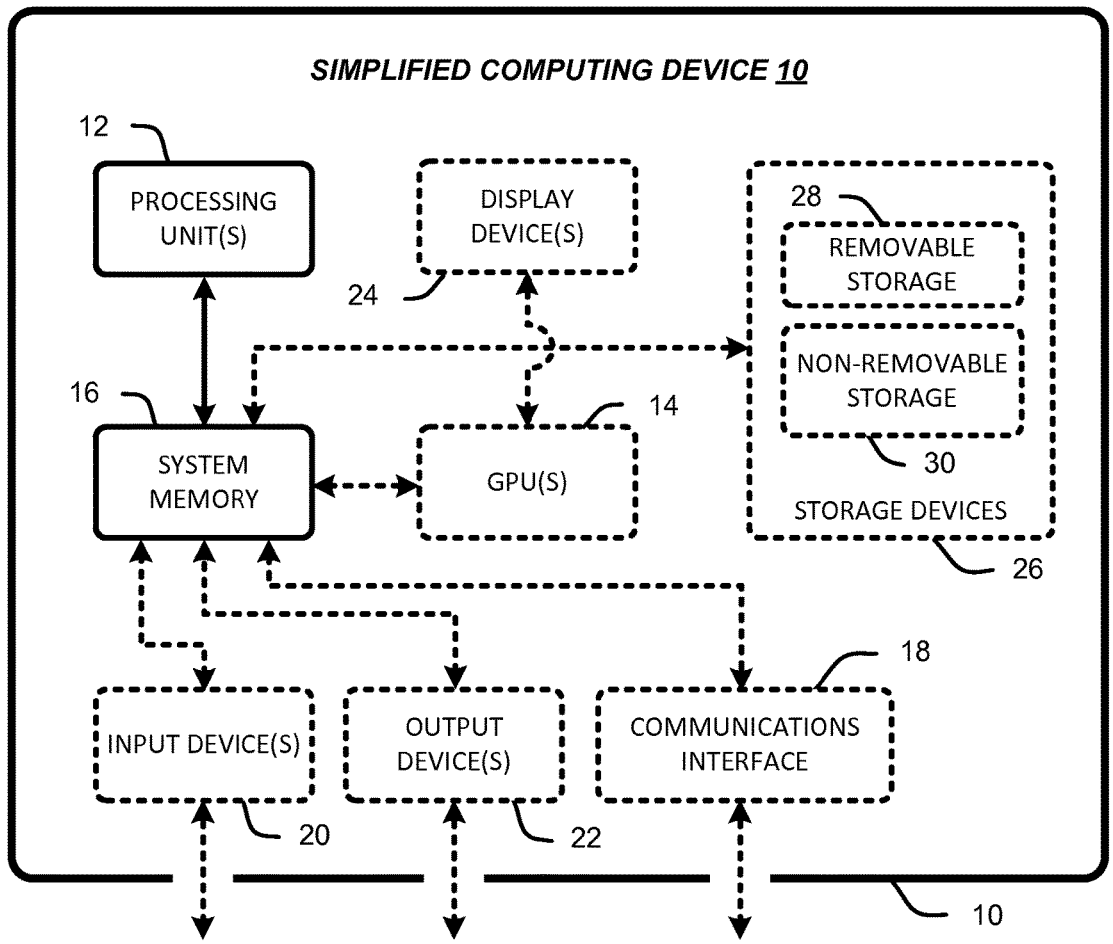
FIG. 12 is a diagram depicting a computing device constituting an exemplary system for implementing RIN data model and player platform embodiments described herein.

The RIN data model and player platform embodiments described herein is operational within numerous types of general purpose or special purpose computing system environments or configurations. FIG. 12 illustrates a simplified example of a general-purpose computer system on which various embodiments and elements of the RIN data model and player platform embodiments, as described herein, may be implemented. It should be noted that any boxes that are represented by broken or dashed lines in FIG. 12 represent alternate embodiments of the simplified computing device, and that any or all of these alternate embodiments, as described below, may be used in combination with other alternate embodiments that are described throughout this document.

For example, FIG. 12 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the RIN data model and player platform embodiments described herein, the device should have a sufficient computational capability and system memory to enable basic computational operations. In particular, as illustrated by FIG. 12, the computational capability is generally illustrated by one or more processing unit(s) 12, and may also include one or more GPUs 14, either or both in communication with system memory 16. Note that that the processing unit(s) 12 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 12 may also include other components, such as, for example, a communications interface 18. The simplified computing device of FIG. 12 may also include one or more conventional computer input devices 20 (e.g., pointing devices, keyboards, audio input devices, video input devices, haptic input devices, devices for receiving wired or wireless data transmissions, etc.). The simplified computing device of FIG. 12 may also include other optional components, such as, for example, one or more conventional computer output devices 22 (e.g., display device(s) 24, audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 12 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the RIN data model and player platform embodiments described herein, or portions thereof may be stored, received, transmitted, or read from any desired combination of computer or machine readable media or storage devices and communication media in the form of computer executable instructions or other data structures.

Finally, the RIN data model and player platform embodiments described herein may be father described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still father, the aforementioned instructions may be implemented, in part or in whole, as hardware logic circuits, which may or may not include a processor.

5.0 Conversion of Declarative Statements to RIN Data

Figure 13:
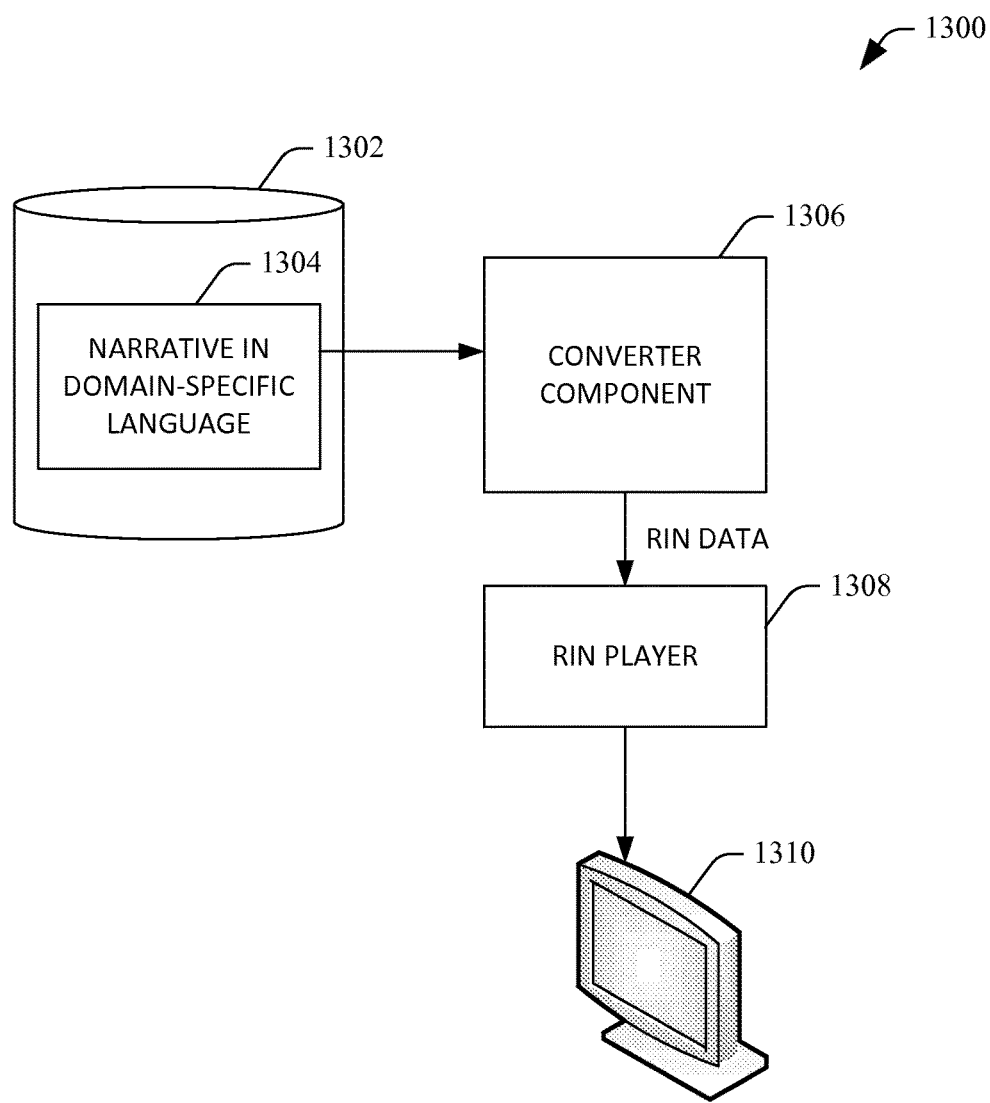
FIG. 13 is a functional block diagram of an exemplary system that facilitates conversion of declarative statements written in a domain specific programming language to RIN data.

With reference now to FIG. 13, an exemplary system 1300 that facilitates conversion of a narrative written in a domain specific language to RIN data is illustrated. The system 1300 comprises a computer readable data repository 1302 that comprises a narrative written in a domain specific language 1304. As will be understood by one skilled in the art, a domain specific language is a programming language or specification language that is dedicated to a particular problem domain, a particular problem representation technique, and/or a particular solution technique. Exemplary domains include, hut are not limited to, a slideshow domain, such that the narrative in the domain specific language 1304 describes a sequence of images/animations that is to be presented in a slide show and/or any audio that is to be output together with such images/animations. Another exemplary domain pertains to web-based tutorials, wherein a sequence of images/animations are presented to an end user that present instructions as to how to perform a particular task (e.g. how to utilize certain functionality on a webpage).

The narrative in the domain specific language 1304 includes a plurality of declarative statements such that the plurality of declarative statements define the narrative. The narrative has a sequence that includes at least one audio file, at least one image file, at least one video file, or a combination thereof. Accordingly, the narrative in the domain specific language 1304 comprises a plurality of declarative statements that define the narrative, wherein such narrative is interactive in nature such that the end user can interact with the narrative. As described above, in an exemplary embodiment, the narrative in the domain specific language 1304 can be implemented in XML or HTML, such that the declarative statements can be interpreted by a web browser. The domain specific language, however, can be implemented using any suitable programming language.

The system 1300 further comprises a converter component 1306 that receives the narrative in the domain specific language 1304 and converts such narrative in the domain specific language 1304 to RIN data. The RIN data conforms to the MIN data model/specification that has been described above. A RIN player 1308 receives the RIN data and causes the rich interactive narrative to be presented on a computing device 1310 (e.g., on a display screen, via audio equipment, . . . ). As will be described below, the data repository 1302 may be a portion of memory that is utilized by a web browser, and the narrative in the domain specific language 1304 can be included in a web page. The converter component 1306 may reside on a network-accessible data store, and can be retrieved by a web browser executing on the client computing device, where the converter component 1306 can convert the narrative in the domain specific language to the WIN data. In another embodiment, the converter component 1306 can remain at the network-accessible data store, can be provided with the narrative in the domain specific language 1304, and can cause resulting WIN data to be transmitted to the browser executing on the client. The RIN player 1308 can be a configured to execute in the web browser (may be a downloadable plug-in to the web browser). The end user, when loading the web page into the web browser, can thus be provided with the rich interactive narrative that is defined by the narrative in the domain specific language 1304.

In an exemplary embodiment, the rich interactive narrative may be presented as a slideshow, such that a sequence of images/animations and accompanying audio are presented to the user on the computing device 1310 in the sequence defined by the declarative statements in the narrative in the domain specific language 1304. The end user may cause the sequence to be paused by interacting with the slideshow that is presented on the web page and/or controls that are presented on the web page (that are native to the RIN player 1308). For instance, as discussed above, the end user may explore a particular image in the slideshow on the web page, may be provided with additional information pertaining to the image, etc. In another exemplary embodiment, the rich interactive narrative can be embodied as a web-based tutorial, wherein a sequence of images, videos and/or corresponding audio is presented to the end user on the web page. For example, the web-based tutorial may instruct the user with respect to interacting with content on the web page. Again, the user may interact with the narrative through utilization of voice commands, depressing a touch sensitive screen, etc.

In still yet another example, the rich interactive narrative may be embodied has a series of highlighted faces in an image and accompanying audio files or textual information. For instance, a designer of a web page may wish to present data about a plurality of individuals shown in an image. The designer of the web page may utilize declarative statements to cause certain faces in the image to be highlighted in a particular order, and accompanying information to be presented to the viewer of the web page as respective faces are highlighted. The converter component 1306 can convert the declarative statements into RIN data, and the RIN player 1308 can cause the rich interactive narrative to be presented to a viewer of the web page. There are a countless number of possible domains (slideshows, web tutorials, games, etc.) where domain specific languages can be employed to write declarative statements, which in turn define a narrative, and each of these domains are contemplated and intended to fall under the scope of the hereto-appended claims.

Figure 14:
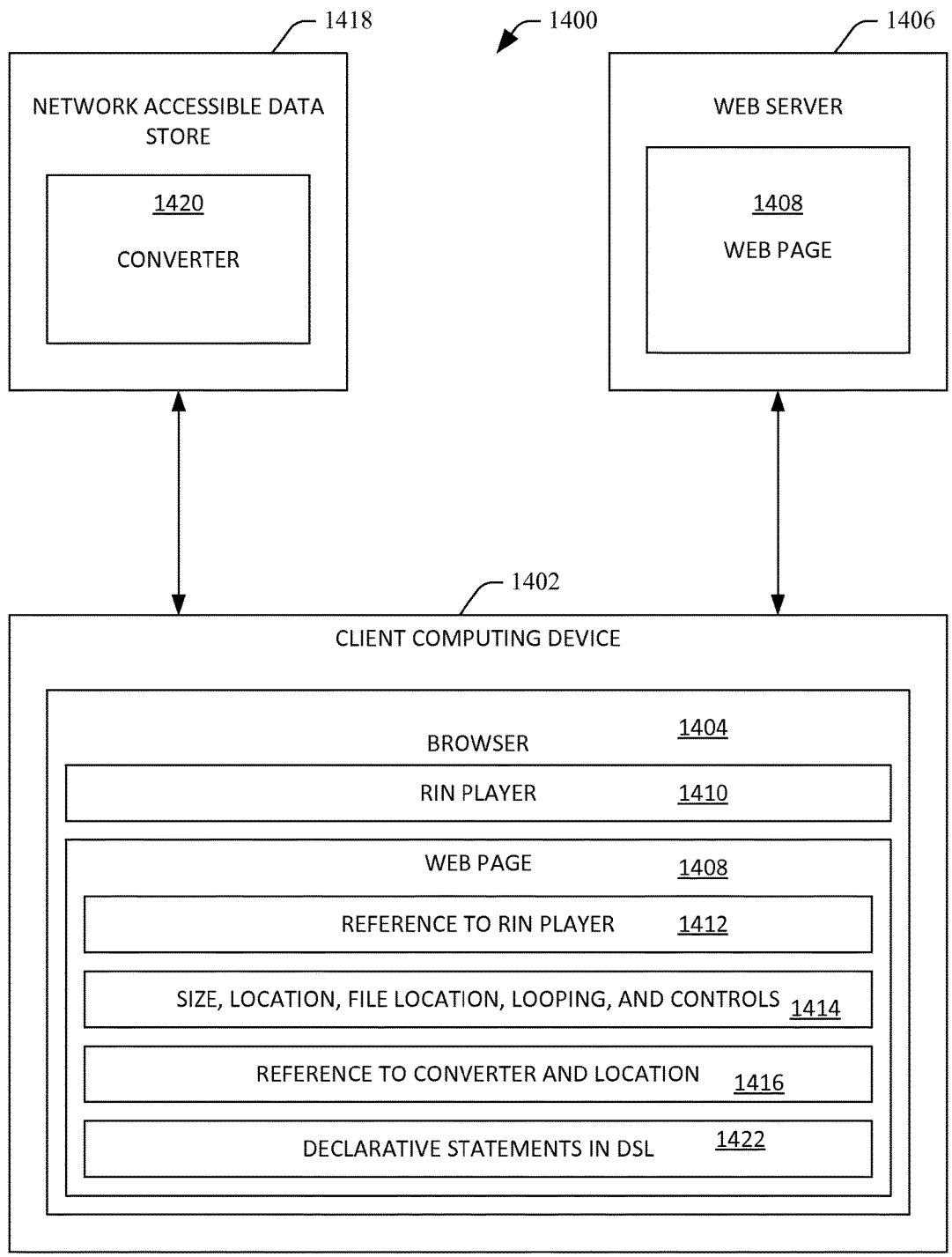
FIG. 14 is a functional block diagram of an exemplary system that facilitates displaying a rich interactive narrative on a web browser on a client computing device.

Now referring to FIG. 14, an exemplary system 1400 that facilitates presentation of a rich interactive narrative on a web page to a user is illustrated. The system 1400 comprises a client computing device 1402 with a web browser 1404 executing thereon. The client computing device 1402 may be any suitable client-side computing device, including but not limited to a desktop computing device, a laptop computing device, a tablet computing device, a mobile telephone, a mobile gaming console, a gaming console, a mobile media player, or any other suitable client computing device. Further, as shown the client computing device 1402 executes the browser 1404; it is to be understood, however, that some other suitable client-side application that can present network-accessible information to a user may also be executed by the client computing device 1402.

The system 1400 also comprises a web server 1406 that hosts a web page 1408. A user of the client computing device 1402 directs the browser 1404 to the web server 1406 and retrieves the web page 1408 therefrom. The browser 1404 can have a RIN player 1410 included therein. For example, the RIN player 1410 may be downloaded as a plug-in to the browser 1404, such that the browser 1404 is natively able to present RINs to a user of the client computing device 1402.

In an exemplary embodiment, the web page 1408 may be written in HTML, XML, or other suitable language that can be interpreted by the browser 1404. Content of the web page 1408 includes a reference to the RIN player 1410, such that the browser 1404 can ascertain that the RIN player 1410 is desirably invoked. The web page 1408 may further include data 1414 that is indicative of a size, display location, file location, looping, and controls, of a RIN desirably played by the RIN player 1410. The size can indicate a size of any graphics that are to be displayed on a rendered web page. A display location can indicate where on the web page the RIN is desirably displayed (upper corner, center, etc.). As indicated above, the RIN may include images, animations, videos, audio, or the like. The tile location can indicate where (URL, IP address, etc.) such images, animations, videos, etc. are located. For instance, such may be located on the web server 1406. The file locations, however, may be located in some other network accessible data repository.

Pursuant to an example, the RIN may be a sequence of images, videos, etc., and looping can indicate whether it is desired that the RIN be performed in a continuous loop. Accordingly, a developer of the webpage 1408 can indicate whether looping is desired. Controls can refer to graphic control buttons that can be selected by a viewer of the web page 1408, wherein the graphic control buttons allow the user to interact with the RIN through one or more buttons. Such buttons can include a pause button, a skip button etc. As mentioned, the controls may be natively supported by the RIN player 1410. While certain exemplary content has been discussed with respect to a RIN, it is to be understood that other content is also contemplated, such as maps, zooming technologies, panoramas, pivots, and the like.

The webpage 1408 may also include data 1416 that comprises a reference to a converter as well as a converter location. The converter can be a computer-executable file that can receive decorative statements in a domain specific language and convert such statements to RIN data that is executable by the RIN player 1410. Pursuant to an example, the system 1400 can include a network-accessible data store 1418 that includes a converter 1420. In an exemplary embodiment, the browser 1404, upon interpreting the reference to the converter and converter location in the data 1416, can access the network-accessible data store 1418 and retrieve the converter 1420. The web page 1408 on the client computing device 1402 may also include declarative statements written in the domain specific language 1422. The browser 1404 can direct the declarative statements in the domain specific language 1422 to the retrieved converter 1420, such that the declarative statements in the domain specific language 1422 are converted to RIN data that is played by the RIN player 1410. Accordingly, an end user of the client computing device 1402 is presented with a rich interactive narrative on the web page while the developer of the web page need not invoke complex server-side code to present the rich interactive narrative to the end-user.

Rather than the converter 1420 being retrieved by the browser 1404 and transmitted to the client computing device 1402, in another exemplary embodiment the browser 1404 can be configured to transmit the declarative statements in the domain specific language 1422 to the network accessible data store 1418, such that the converter 1420 converts the declarative statements in the domain specific language 1422 at the network-accessible data store 1418. The RIN data output by the converter 1420 may then be transmitted back to the client computing device 1402 such that it can be played by the RIN player 1410.

Figure 15:
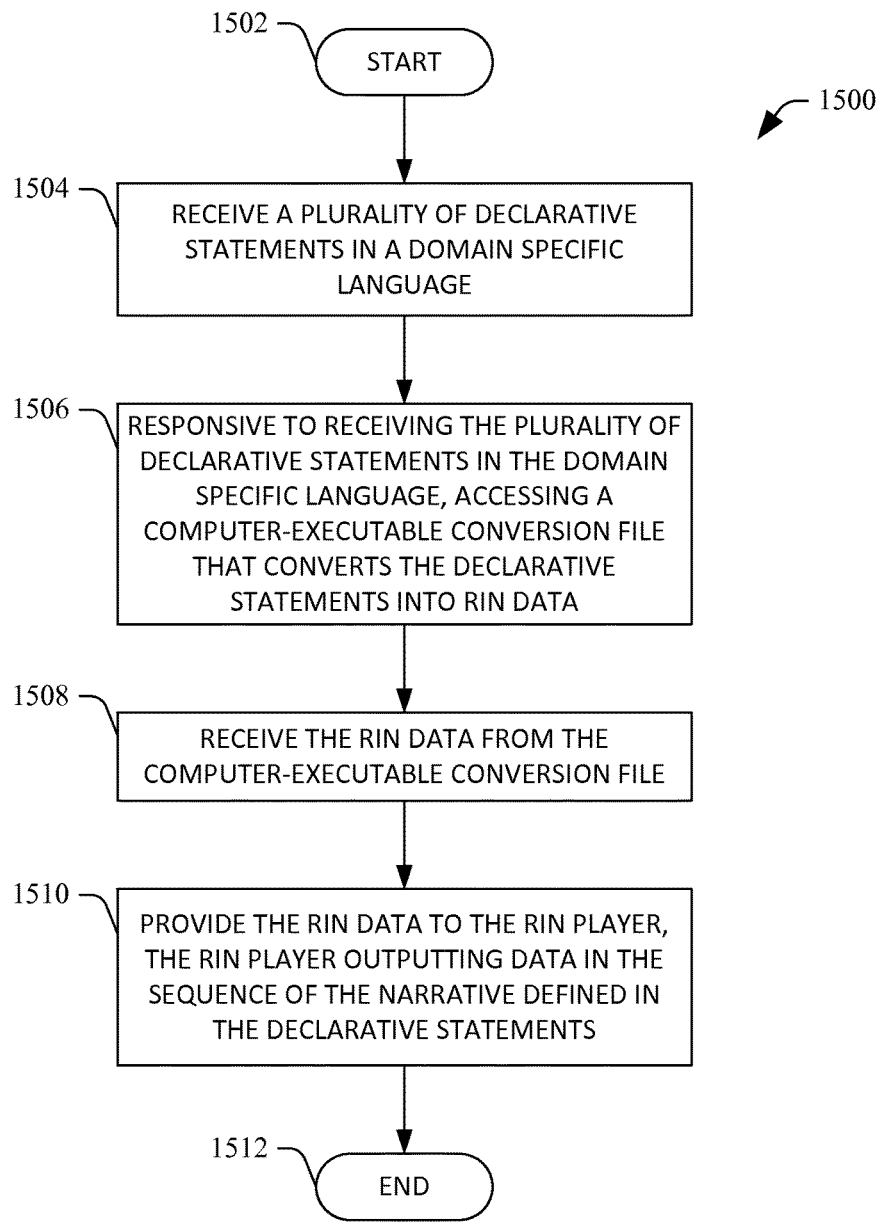
FIG. 15 is a flow diagram that illustrates an exemplary methodology for providing RIN data to a RIN player, wherein the RIN data is a conversion of declarative statements written in a domain specific programming language.
Figure 16:
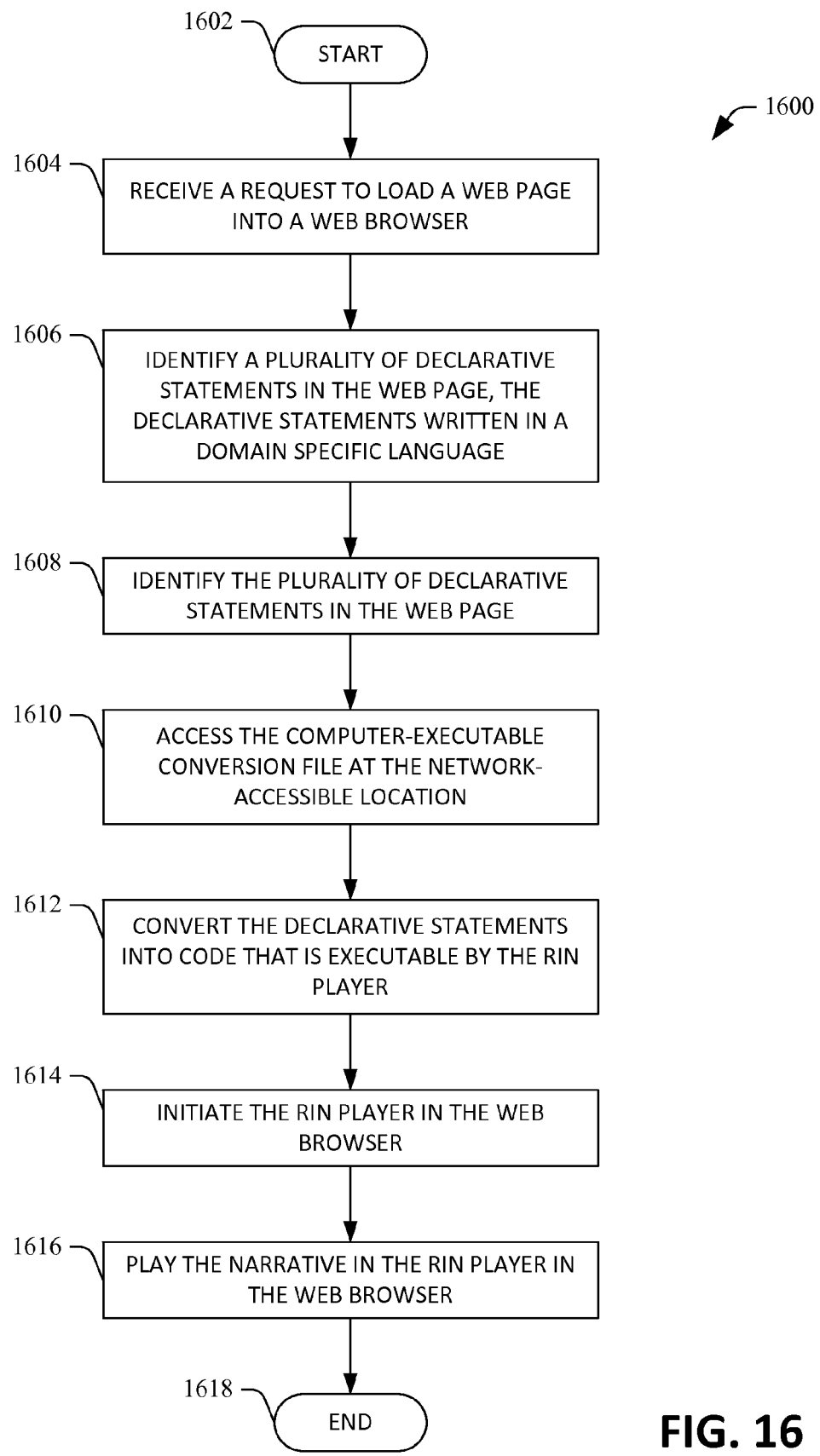
FIG. 16 is a flow diagram illustrating an exemplary methodology for playing the rich interactive narrative on a web page.

With reference now to FIGS. 15-16, various exemplary methodologies are illustrated and described. While the methodologies are described as being a series of acts that are performed in a sequence, it is to be understood that the methodologies are not limited by the order of the sequence. For instance, some acts may occur in a different order than what is described herein. In addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, (lash drive, or the like. As used herein, the term "computer-readable medium" is not intended to encompass a propagated signal.

Now referring to FIG. 15, an exemplary methodology 1500 that facilitates providing a RIN player with RIN data, which is a conversion of declarative statements written in a domain specific language is illustrated. The methodology 1500 starts at 1502, and at 1504 a plurality of declarative statements are received, wherein the plurality of declarative statements are written in a domain specific language. As described above, the plurality of declarative statements defines a narrative, wherein the narrative has a sequence that includes at least one of an audio file, an image file, a video file or some combination thereof. For instance, declarative statements can define a sequence of display of images/animations in a slideshow, an amount of time individual images/animations are to be presented in the slideshow, etc.

At 1506, responsive to receiving the plurality of declarative statements in the domain specific language, a computer executable conversion file is accessed that converts the declarative statements into RIN data. The computer-executable conversion file can be retrieved, for example, from a library of conversion files.

At 1508, the RIN data is received from the computer executable conversion file, and at 1510 the RIN data is provided to the RIN player, wherein the RIN player outputs the at least one of the audio file, the image file, the video file, or the combination thereof in the sequence of the narrative defined in the declarative statements. As mentioned above, in an exemplary embodiment, the RIN player may be a downloadable plug-in to a browser such that the rich interactive narrative is presented on a web page to a user. The methodology 1500 completes at 1512.

Referring now to FIG. 16, an exemplary methodology 1600 that facilitates playing a rich interactive narrative using a RIN player in a web browser is illustrated. The methodology 1600 starts at 1602, and at 1604 a request to load a web page into a web browser is received. The webpage includes a plurality of the declarative statements therein that are written in a domain specific language. Wherein the plurality of declarative statements defines a narrative with a sequence. The sequence comprises a plurality of images that are to be displayed on the web page in conformance with the sequence (without interaction by an end-user). In other words, if the end-user does not interact with the rich interactive narrative, the images will be displayed in the sequence defined by the declarative statements. The web page also includes an indication of position on the web page where the images are to be displayed, a time interval each image is to be displayed, and network-accessible location(s) of the images. Still further, the web page can include data that identifies a network-accessible location of a computer-executable conversion file that converts the declarative statements in the domain specific language to code that is executable by a RIN player.

At 1606, a plurality of declarative statements are identified in the web page, wherein the declarative statements are written in the domain specific language. At 1608, the computer-executable conversion file identified in the web page is accessed at the network-accessible location. For example, the computer-executable conversion file can be downloaded to the computing device that is executing the web browser. At 1610, the computer-executable conversion file is employed to convert the declarative statements into code that is executable by the RIN player.

At 1612, the RIN player is initiated in the web browser, and at 1614 the RIN is played by the RIN player executing in the web browser. Thus, the end user will be provided with the plurality of images that are displayed on the web page in conformance with the sequence defined in the declarative statements, wherein the plurality of images are displayed on the web page at a position identified in the web page and at time intervals identified in the web page. The methodology 1600 completes at 1616.

Figure 17:
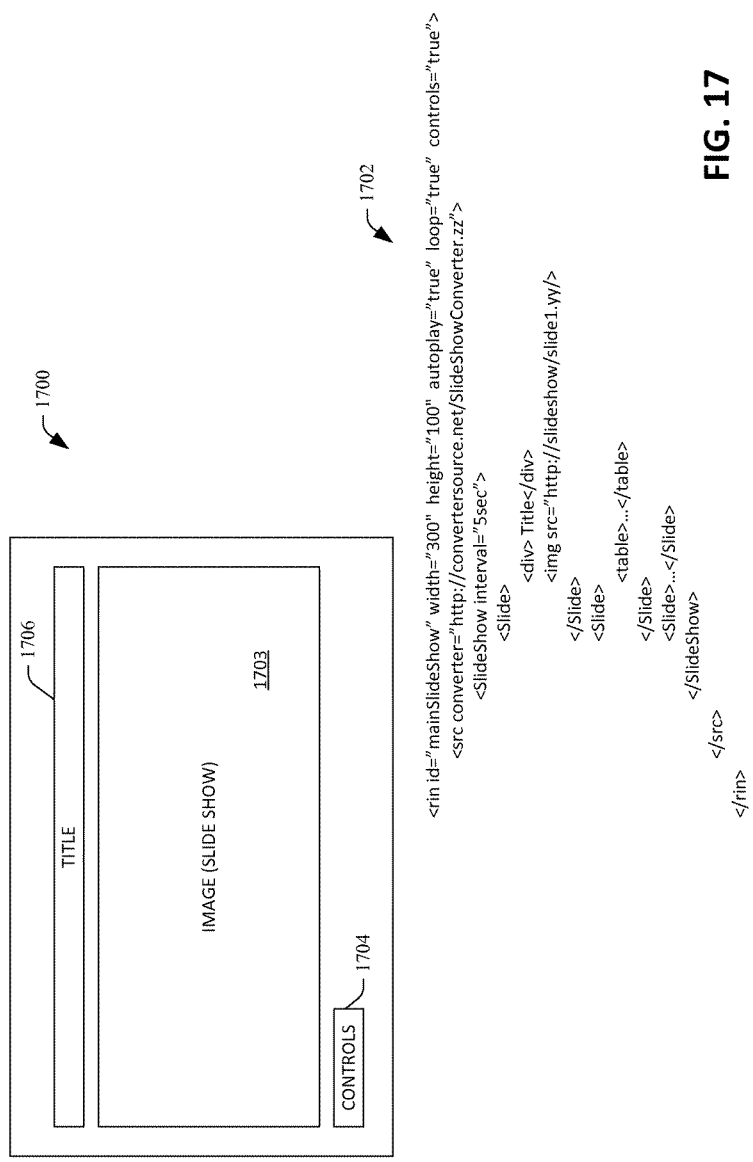

With reference now to FIG. 17, an exemplary web page 1700 and corresponding source code 1702 is illustrated. The web page 1700 includes a slideshow 1703, wherein images selected by the developer of the web page are displayed in a predefined sequence for some predefined intervals (assuming that an end-user does not interact with the slideshow 1703). The web page 1700 can further include controls 1704 that are packaged with a RIN player, such that the user can skip an image in the slideshow 1703, pause the slideshow 1703, or interact with the slide show in some other manner. The web page 1700 further includes a title 1706 that is defined in the underlying source code.

The source code 1702 includes data that indicates that the RIN player is desirably invoked, and that the RIN has a defined (width of 300 and height of 100). Further, the RIN player is informed that the slideshow 1703 is to be automatically started upon the web browser loading the webpage (user interaction is not required to initiate the slideshow), that the slideshow 1703 on the web page 1700 desirably loops (repeats while the user is viewing the web page 1700), and that the controls 1704 are desirably displayed on the webpage 1700.

The source code 1702 also includes an indication of a location of a computer-executable conversion file that can convert declarative statements written in a domain specific language to data that is executable by the RIN player.

The source code 1702 includes a declarative statement that identifies the length of time that each image of the slideshow 1703 is to be displayed on the slideshow (5 seconds), a declarative statement that identifies a title of a slide, data that indicates a location of an image to be included in the slide, amongst other information. From reviewing the source code 1702, it can be understood that a relatively complex rich interactive narrative can be developed by a web developer for presentation to an end-user without inclusion of relatively complex server-side code. While FIG. 17 depicts a slideshow, other domains including, for instance, web tutorials, gameplay (e.g. a chess tutorial combined with the ability to play a game of chess), amongst other domains are contemplated by the inventors and are intended to fall under the scope of the hereto appended claims. Furthermore, advertisers may wish to utilize techniques described herein to present rich interactive advertisements to a user through utilization of a RIN player and conversion of declarative statements.

It is to be understood that, with respect to web tutorials and other applications, a RIN may run in "windowless mode", meaning it may have no discernible borders like a conventional image or video. In an example, the RIN may include an audio narration, and such narration may occur on a host web page by simulating a mouse hover, mouse clicks, keyboard entries, or the like. In an exemplary embodiment, a web tutorial may be configured to assist a user in learning to utilize a web-based email service. When the user logs into the email service, a RIN can be initiated that causes a mouse to begin clicking on various menus to show capabilities of the web-based email service, while an audio narrative is presented. The only RIN-specific UI element that is visible to a user may be a button that allows the user to pause or stop the narrative.

With reference now to FIG. 18, an exemplary RIN 1800 and corresponding source code 1802 is illustrated. The RIN 1802 is configured to illustrate a travel tour between cities New Delhi, Agra, and Jaipur on a map. From reviewing the source code 1802, it can be ascertained that the RIN loops and that no controls are depicted together with the RIN. Moreover, routes between cities on the map are drawn at 4 second intervals.

Figure 19:
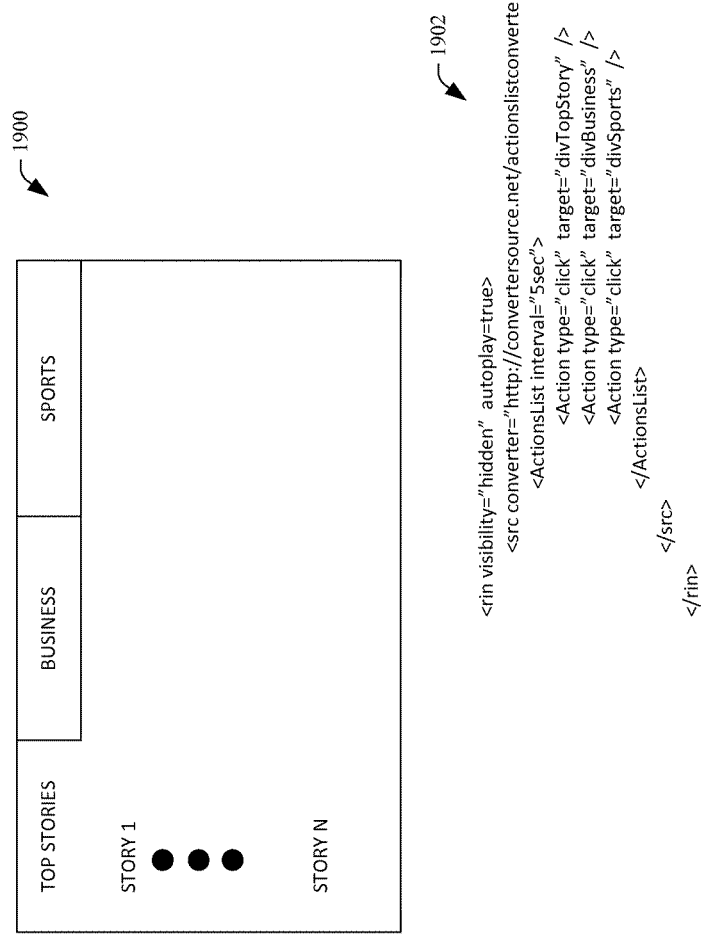

Now referring to FIG. 19, an exemplary RIN 1900 and corresponding source code 1902 is illustrated. The RIN 1902 is configured present content that is available by selecting tabs in a graphical element of a web page. For instance, upon loading the web page into a browser, the user experience will be presentation of top stories (shown in the "top stories" tab), followed by presentation of business news (seen when selecting the "business" tab), followed by presentation of sports news (seen when selecting the "sports" tab). As can be discerned by reviewing the source code 1902, the "top stories" tab will first be selected, followed 5 second later by selection of the "business" tab, followed 5 seconds later by selection of the "sports" tab. The developer of the web page can cause the RIN to be displayed through utilization of statements in a declarative language, which are converted to a format suitable for the RIN player by a converter called in source code of the web page. Again, it is to be understood that other types of RINs are contemplated. For instance, a RIN may be designed as a gameplay walkthrough, such as displaying chess moves. In such an example, declarative statements can be employed to present a narrative pertaining to the game of chess to a user.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method that facilitates conversion of declarative statements in a domain specific language to data that is executable by an interactive narrative player, the method comprising:
   receiving a plurality of declarative statements in the domain specific language, the plurality of declarative statements defining a narrative and a sequence of the narrative, the sequence defines an order in which interactive segments are included in the narrative, each interactive segment includes an interactive environment that is traversable by an end user who is presented with the narrative;
   responsive to receiving the plurality of declarative statements in the domain specific language, converting, using a computer-executable conversion file, the declarative statements to interactive narrative data, the interactive narrative data executable by the interactive narrative player; and
   providing the interactive narrative data to the interactive narrative player, the interactive narrative player outputting the narrative in the sequence defined by the declarative statements, the narrative output by way of a computing device.

2. The method of claim 1, wherein the plurality of declarative statements are written in XML.

3. The method of claim 1, wherein the plurality of declarative statements are comprised by a web page.

4. The method of claim 1, wherein the plurality of segments comprise a plurality of images, the method further comprising presenting, by the interactive narrative player, the plurality of images on a web page in the order defined in the plurality of declarative statements.

5. The method of claim 1, the interactive narrative player being referenced in a web page.

6. The method of claim 5 configured for execution by a web browser.

7. The method of claim 6, wherein the web page includes machine-readable code, the machine-readable code comprising data that identifies a network-accessible location of the computer-executable conversion file, the machine-readable code comprising data that identifies a network-accessible location of at least one interactive segment in the interactive segments.

8. The method of claim 6, wherein the declarative statements comprise data that identifies a size of the narrative to be presented by the interactive narrative player on the web page.

9. The method of claim 1, wherein the declarative statements comprise an indication that selectable controls are to be displayed on a web page that is to display the narrative, the method further comprising:

presenting, by the interactive narrative player, the narrative on the web page;

presenting, by the interactive narrative player, the selectable controls on the web page while the narrative is presented;

receiving a selection of the selectable controls; and causing the narrative to pause responsive to receiving the selection of the selectable controls.

10. The method of claim 1, further comprising:

responsive to receiving the plurality of declarative statements in the domain specific language, accessing the computer-executable conversion file from a library of computer-executable conversion files.

11. The method of claim 1, the narrative being a web tutorial that comprises a sequence of instructions.

12. A system that facilitates provision of an interactive narrative to an end user, the system comprising:

a processor; and memory that comprises instructions that, when executed by the processor, cause the processor to perform acts comprising:

converting a plurality of declarative statements written in a domain specific language to a data format that is executable by an interactive narrative player, the plurality of declarative statements defining the interactive narrative, the interactive narrative being at least one of an audio or video narrative, the interactive narrative has a sequence of segments, each segment comprising at least one of an audio clip, an image, or a video, the sequence defines an order of presentment of the segments in the interactive narrative, and each segment being interactive in that the interactive narrative player alters the interactive narrative in response to user interaction with the segment; and using the interactive narrative player, executing the interactive narrative responsive to the converter component converting the plurality of declarative statements from the domain specific language to the data format that is executable by the interactive narrative player.

13. The system of claim 12 being comprised by a mobile telephone.

14. The system of claim 12 being comprised by a tablet computing device.

15. The system of claim 12, the interactive narrative player being a downloadable plug-in for a web browser.

16. The system of claim 12, the plurality of statements in the domain specific language configured to define a sequence of images that are to be displayed on a web page as a slideshow, the interactive narrative player configured to present the images in the sequence responsive to the converter component converting the plurality of statements from the domain specific language to the data format that is executable by the interactive narrative player.

17. The system of claim 12, the plurality of statements in the domain specific language configured to define a sequence of audio and/or video instructions in a web tutorial on a web page, the interactive narrative player configured to present the audio and/or video instructions in the sequence responsive to the converter component converting the plurality of statements from the domain specific language to the data format that is executable by the interactive narrative player.

18. The system of claim 12, the interactive narrative comprising a sequence of images, and the declarative statements defining an order of presentation of the sequence of images on a web page.

19. The system of claim 18, the declarative statements further defining an amount of time an image is to be presented on a web page prior to a next image of the sequence being presented on the web page.

20. A computer-readable medium comprising instructions that, when executed by a processor, cause the processor to perform acts comprising:

receiving a request to load a web page into a web browser, the web page comprising a plurality of declarative statements therein that are written in a domain specific language, the plurality of declarative statements defining a narrative with a sequence, the sequence comprising a plurality of images that are to be displayed on the web page in conformance with the sequence, each image in the plurality of images having at least one interactive element associated therewith, the web page comprising an indication of position on the web page where the images are to be displayed, a durations of time that each image is to be displayed, and network-accessible locations of the images, the web page further comprising a network-accessible location of a computer-executable conversion file that converts the declarative statements in the domain specific language to code that is executable by an interactive narrative player;

identifying the plurality of declarative statements in the web page;

responsive to identifying the declarative statements, accessing the computer-executable conversion file at the network-accessible location;

using the computer-executable conversion file, converting the declarative statements into the code that is executable by the interactive narrative player;

initiating the interactive narrative player in the web browser; and executing, at the interactive narrative player, the code, wherein executing the code causes the plurality of images to be displayed on the web page in conformance with the sequence, wherein the plurality of images are displayed on the web page at the position identified in the web page and for the time durations identified in the web page.

* * * * *